US012330151B2

(12) United States Patent
Hung et al.

(10) Patent No.: US 12,330,151 B2
(45) Date of Patent: Jun. 17, 2025

(54) DEVICES AND METHODS FOR SAMPLE PROCESSING

(71) Applicant: Combinati Incorporated, Carlsbad, CA (US)

(72) Inventors: Ju-Sung Hung, Palo Alto, CA (US); Felicia Linn, Patterson, CA (US); Andrew Zayac, Redwood City, CA (US)

(73) Assignee: COMBINATI INCORPORATED, Carlsbad, CA (US)

(*) Notice: Subject to any disclaimer, the term of this patent is extended or adjusted under 35 U.S.C. 154(b) by 915 days.

(21) Appl. No.: 17/487,943

(22) Filed: Sep. 28, 2021

(65) Prior Publication Data

US 2022/0097054 A1 Mar. 31, 2022

Related U.S. Application Data

(63) Continuation of application No. PCT/US2021/052206, filed on Sep. 27, 2021.

(Continued)

(51) Int. Cl.
*B01L 3/00* (2006.01)
*B01F 33/302* (2022.01)

(Continued)

(52) U.S. Cl.
CPC . *B01L 3/502715* (2013.01); *B01L 2200/0689* (2013.01); *B01L 2300/12* (2013.01); *B01L 2300/168* (2013.01)

(58) Field of Classification Search
CPC ....... B01L 3/502715; B01L 2200/0689; B01L 2300/12; B01L 2300/168; B01L 2400/049;

(Continued)

(56) References Cited

U.S. PATENT DOCUMENTS 5,807,522 A 9/1998 Brown et al.
6,503,711 B1 1/2003 Krull et al.

(Continued)

FOREIGN PATENT DOCUMENTS

CN 104877905 A 9/2015
CN 104894106 A 9/2015

(Continued)

OTHER PUBLICATIONS

Ahrberg, CD, et al. Polymerase Chain Reaction in Microfluidic Devices. Lab Chip. Sep. 6, 2016, vol. 16; pp. 3866-3884. DOI: 1 0.1039/c61c00984k.

(Continued)

*Primary Examiner* — Jennifer Wecker
*Assistant Examiner* — Oyeleye Alexander Alabi

(57) ABSTRACT

The present disclosure provides systems, methods, and devices for processing a biological sample. The device may be a microfluidic device comprising a first channel, at least one chamber, and a second channel. The first channel may be in fluid communication with the chamber. The chamber may be configured to receive a portion of the biological sample from the channel. The second channel may be configured for pressurized outgassing of the chamber, first channel, or both the chamber and first channel.

17 Claims, 17 Drawing Sheets

Related U.S. Application Data

(60) Provisional application No. 63/084,271, filed on Sep. 28, 2020.

(51) Int. Cl.

*B01F 33/3033* (2022.01)
*B01L 7/00* (2006.01)
*C12Q 1/6848* (2018.01)
*C12Q 1/686* (2018.01)
*G01N 21/29* (2006.01)

(58) Field of Classification Search

CPC ........... B01L 3/50273; B01L 3/502738; B01L 3/502746; B01L 3/50851; B01L 2200/0621; B01L 2200/0684; B01L 2300/0816; B01L 2300/0864; B01L 2400/0487; B01L 3/502723

See application file for complete search history.

(56) References Cited

U.S. PATENT DOCUMENTS

| | | | |
|---|---|---|---|
| 7,608,160 B2 | 10/2009 | Zhou et al. | |
| 8,715,446 B2 | 5/2014 | Roswech et al. | |
| 8,871,446 B2 | 10/2014 | Hong et al. | |
| 9,213,042 B2 | 12/2015 | Oldham et al. | |
| 9,845,499 B2 | 12/2017 | Hung et al. | |
| 10,252,266 B2 | 4/2019 | Hung et al. | |
| 10,369,566 B2 | 8/2019 | Roy et al. | |
| 10,519,494 B2 | 12/2019 | Zayac et al. | |
| 11,285,478 B2 | 3/2022 | Hung et al. | |
| 2002/0124879 A1* | 9/2002 | Kaplan ................. | F04B 19/006 137/13 |
| 2003/0106799 A1 | 6/2003 | Covington et al. | |
| 2003/0190608 A1 | 10/2003 | Blackburn | |
| 2004/0110275 A1 | 6/2004 | Sandell | |
| 2005/0009101 A1 | 1/2005 | Blackburn | |
| 2007/0014695 A1 | 1/2007 | Yue et al. | |
| 2007/0099290 A1 | 5/2007 | Iida et al. | |
| 2008/0190220 A1 | 8/2008 | Backes et al. | |
| 2008/0223721 A1 | 9/2008 | Cohen et al. | |
| 2009/0250347 A1 | 10/2009 | Powell et al. | |
| 2011/0003286 A1 | 1/2011 | Hanafusa et al. | |
| 2011/0003699 A1 | 1/2011 | Yoder et al. | |
| 2011/0020179 A1 | 1/2011 | Yue et al. | |
| 2011/0233446 A1 | 9/2011 | Chuang et al. | |
| 2012/0107818 A1 | 5/2012 | Rothmann et al. | |
| 2013/0130232 A1 | 5/2013 | Weibel et al. | |
| 2014/0291558 A1 | 10/2014 | Laermer et al. | |
| 2014/0323358 A1 | 10/2014 | Oldham et al. | |
| 2016/0025761 A1 | 1/2016 | West et al. | |
| 2016/0214112 A1 | 7/2016 | Saito et al. | |
| 2016/0228874 A1 | 8/2016 | Lee et al. | |
| 2016/0318023 A1 | 11/2016 | Marble et al. | |
| 2017/0096705 A1 | 4/2017 | Stern et al. | |
| 2017/0283855 A1 | 10/2017 | Hung et al. | |
| 2018/0015464 A1 | 1/2018 | Levner et al. | |
| 2018/0304254 A1 | 10/2018 | Hung et al. | |
| 2020/0001291 A1 | 1/2020 | Hung et al. | |
| 2020/0248232 A1 | 8/2020 | Hung et al. | |
| 2020/0384471 A1 | 12/2020 | Lin et al. | |
| 2021/0016274 A1 | 1/2021 | Garstecki et al. | |
| 2021/0197202 A1 | 7/2021 | Zayac et al. | |
| 2022/0023859 A1 | 1/2022 | Hung et al. | |

FOREIGN PATENT DOCUMENTS

| | | | |
|---|---|---|---|
| CN | 204727866 | U | 10/2015 |
| CN | 105289762 | A | 2/2016 |
| CN | 105980863 | A | 9/2016 |
| JP | 2003514221 | A | 4/2003 |
| JP | 2003517591 | A | 5/2003 |
| JP | 2003520972 | A | 7/2003 |
| JP | 2004532003 | A | 10/2004 |
| JP | 2005329333 | A | 12/2005 |
| JP | 2009236555 | A | 10/2009 |
| JP | 2010515924 | A | 5/2010 |
| WO | WO-2007011867 | A2 | 1/2007 |
| WO | WO-2007050539 | A2 | 5/2007 |
| WO | WO-2009102788 | A2 | 8/2009 |
| WO | WO-2009105499 | A1 | 8/2009 |
| WO | WO-2012162779 | A1 | 12/2012 |
| WO | WO-2013130910 | A1 | 9/2013 |
| WO | WO-2013177206 | A2 | 11/2013 |
| WO | WO-2014039963 | A1 | 3/2014 |
| WO | WO-2015023616 | A2 | 2/2015 |
| WO | WO-2015085181 | A1 | 6/2015 |
| WO | WO-2016170109 | A1 | 10/2016 |
| WO | WO-2017176699 | A1 | 10/2017 |
| WO | WO-2018094091 | A1 | 5/2018 |
| WO | WO-2018130405 | A1 | 7/2018 |
| WO | WO-2019108851 | A1 | 6/2019 |
| WO | WO-2019195391 | A1 | 10/2019 |
| WO | WO-2020123406 | A1 | 6/2020 |
| WO | WO-2021150855 | A1 | 7/2021 |
| WO | WO-2021262581 | A1 | 12/2021 |
| WO | WO-2022067184 | A1 | 3/2022 |

OTHER PUBLICATIONS

Alrifaiy et al. Polymer-based microfluidic devices for pharmacy, biology and tissue engineering. Polymers 4:1349-1398 (2012).

Bartsch et al., The Rotary Zone Thermal Cycler: A Low-Power System Enabling Automated Rapid PCR, PLoS One. 2015; 10(3): e0118182 Published online Mar. 31, 2015.

Beer et al. On-Chip, Real-Time, Single-Copy Polymerase Chain Reaction in Picoliter Droplets. Anal Chem 79:8471-8475 (2007).

Co-pending U.S. Appl. No. 17/578,942, inventors Hung; Ju-Sung et al., filed Jan. 19, 2022.

Czilwik et al., Microfluidic vapor-diffusion barrier for pressure reduction in fully closed PCR modules, Lab Chip, 2015, 15, 1084-1091.

EP17779629.9 Extended European Search Report dated Oct. 28, 2019.

EP17871760.9 Extended European Search Report dated Jun. 4, 2020.

EP19781814.9 Extended European Search Report dated Dec. 6, 2021.

EP19895762.3 Communication Pursuant to Article 94(3) EPC dated Dec. 16, 2020.

EP19895762.3 Extended European Search Report dated Dec. 10, 2020.

EP21211332.8 Extended European Search Report dated Feb. 28, 2022.

Espira, Inc. Digital PCR. http://www.espirainc.com/digital-per.html (1 pg.) (Feb. 15, 2017).

Focke, Lab-on-a-Foil: Genotyping by real-time PCR in microthermoformed polymer foils on a centrifugal microfluidic platform, Thesis, Institut fur Mikrosystemtechnik (IMTEK) Technische Fakultat Albert-Ludwigs-Universitat Freiburg, Jan. 2010.

Formulatrix. Constellation Digital PCR. http://formulatrix.com/per/index.html (3 pgs.) (Feb. 15, 2017).

Fraley, et al., Universal digital high-resolution melt: a novel approach to broad-based profiling of heterogeneous biological samples, Nucleic Acids Research, vol. 41, No. 18; Aug. 9, 2013: pp. e175-e175, XP055236116.

JN Medsys, Clarity™ Digital PCR Technology, http://www.jnmedsys.com/digital-per-description/ (11 pgs.) (Feb. 15, 2017).

Karlsson et al. Active liquid degassing in microfluidic systems. Lab Chip 13:4366-4373 (2013).

Laher, et al., A detailed micrometer scale investigation of the solvent bonding process for microfluidic chip fabrication. RSC Adv. 2014; 4: 5371-5381.

Lochovsky et al. Bubbles No. more: in-plane trapping and removal of bubbles in microfluidic devices. Lab Chip 12(3):595-601 (2012).

Mahmoodi, et al., Gas-assisted thermal bonding of thermoplastics for the fabrication of microfluidic devices. Microsystem Technologies, 2019; 25: 3923-3932.

(56) References Cited

OTHER PUBLICATIONS

Matellan, et al., Cost-effective rapid prototyping and assembly of poly(methylmethacrylate) microfluidic devices. Scientific Reports, 2018; 8(6971): 1-13.
Men et al. Digital Polymerase Chain Reaction in an Array of Femtoliter Polydimethylsiloxane Microreactors. Anal Chem 84:4262-4266 (2012).
Morrison et al. Nanoliter high through quantitative PCR. Nucleic Acids Res 34(18):e123 (2006).
Neuzil et al., Disposable real-time microPCR device: lab-on-a-chip at a low cost, Mol. BioSyst., 2006,2, 292-298.
Nge et al. Advances in microfluidic materials, functions, integration, and applications. Chem Rev 113(4):2550-2583 (2013).
Ottesen et al. Microfluidic digital PCR enables multigene analysis of individual environmental bacteria. Science 314(5804):1464-1467 (2006).
PCT/US2017/025873 International Search Report and Written Opinion dated Aug. 25, 2017.
PCT/US2017/025873 Invitation to Pay Additional Fees dated Jun. 19, 2017.
PCT/US2017/062078 International Search Report and Written Opinion dated Jan. 30, 2018.
PCT/US2019/025539 Invitation to Pay Additional Fees dated Jun. 10, 2019.
PCT/US2019/065287 International Search Report and Written Opinion dated Feb. 25, 2020.
PCT/US2021/014558 International Search Report and Written Opinion dated Apr. 26, 2021.
PCT/US2021/038206 International Search Report and Written Opinion dated Oct. 12, 2021.
PCT/US2021/052206 International Search Report and Written Opinion dated Jan. 6, 2022.
Pei, et al., Low distortion solvent bonding of microfluidic chips. Procedia Engineeing, 2016; 141:130-137.
Ramakrishnan et al. Integrated Fluidic Circuits (IFCs) for digital PCR. Methods Mol Biol 949:423-431 (2013).
Reisner, Walter et al., Single-molecule denaturation mapping of DNA in nanofluidic channels, Proceedings to the national academy of sciences of the United States of America, Jul. 27, 2010, vol. 107, No. 30, pp. 13294-13299.
Saiki, et al. Primer-directed enzymatic amplification of DNA with a thermostable DNA polymerase. Science, 239(4839):487-491 (Jan. 29, 1988).
Shen et al. Digital PCR on a SlipChip. Lab Chip 10:2666-2672 (2010).
Stilla. Crystal Digital PCR. http://www.stilla.fr/index.html#crystal-digital-per http://www.stilla.fr/index.html (6 pgs.) (Feb. 15, 2017).
U.S. Appl. No. 16/669,205 Office Action dated Mar. 31, 2021.
U.S. Appl. No. 15/363,896 Notice of Allowance dated Aug. 16, 2017.
U.S. Appl. No. 15/363,896 Notice of Allowance dated Oct. 25, 2017.
U.S. Appl. No. 15/363,896 Notice of Allowance dated Sep. 12, 2017.
U.S. Appl. No. 15/783,743 Notice of Allowance dated Nov. 19, 2021.
U.S. Appl. No. 15/783,743 Office Action dated Feb. 8, 2021.
U.S. Appl. No. 15/783,743 Office Action dated Jul. 27, 2020.
U.S. Appl. No. 15/783,743 Office Action dated Mar. 9, 2020.
U.S. Appl. No. 15/783,743 Office Action dated Sep. 26, 2019.
U.S. Appl. No. 16/026,827 Notice of Allowance dated Jan. 24, 2019.
U.S. Appl. No. 16/026,827 Notice of Allowance dated Nov. 16, 2018.
U.S. Appl. No. 16/026,827 Office Action dated Aug. 16, 2018.
U.S. Appl. No. 16/270,457 Office Action dated Aug. 11, 2020.
U.S. Appl. No. 16/669,205 Notice of Allowance dated Apr. 11, 2022.
U.S. Appl. No. 16/669,205 Notice of Allowance dated Oct. 20, 2021.
U.S. Appl. No. 16/989,415 Office Action dated Apr. 6, 2021.
U.S. Appl. No. 16/989,415 Office Action dated Dec. 9, 2020.
U.S. Appl. No. 16/989,415 Office Action dated Nov. 12, 2021.
Vogelstein et al. Digital PCR. PNAS 96(16):9236-9241(1999).
Vykoukal et al. Quantitative Detection of Bioassays with a Low-Cost Image-Sensor Array for Integrated Microsystems. Angewandte Chemie 48:7649-7654 (2009).
Xu et al., Use of a porous membrane for gas bubble removal in microfluidic channels: physical mechanisms and design criteria. Microfluidics and Nanofluidics 9(4-5):765-772 (2010).
Zeonex, Life Sciences, available at: https://www.zeonex.com/life-sciences.aspx.html, 2017, accessed Mar. 25, 2021.
Zhu, et al., A Scalable self-priming fractal branching microchannel net chip for digital PCR, Lab Chip, Mar. 2017, 17:1655-1665.
ZHU. Micro/nanoporous membrane based gas-water separation in microchannel. Journal Microsystem Technologies archive. 15(9):1459-1465 (2009).
EP21873597.5, Extended European Search Report, Sep. 19, 2024, 8 pages.
Hu C., et al., "Gas Separation Properties in Cyclic Olefin Copolymer Membrane Studied By Positron Annihilation, Sorption, and Gas Permeation," Journal of Membrane Science, Apr. 5, 2006, vol. 274, No. 1-2, XP005297021, pp. 192-199.

* cited by examiner

DEVICES AND METHODS FOR SAMPLE PROCESSING

CROSS REFERENCE

This application is a Continuation Application of International Application No. PCT/US2021/052206, filed Sep. 27, 2021, which claims the benefit of U.S. Provisional Application No. 63/084,271, filed on Sep. 28, 2020, which is incorporated herein by reference in its entirety.

BACKGROUND

Microfluidic devices are devices that contain structures that handle fluids on a small scale, such as microliters, nanoliters, or smaller quantities of fluids. One application of microfluidic structures is in digital polymerase chain reaction (dPCR). For example, a microfluidic structure with multiple partitions may be used to partition a nucleic acid sample for dPCR. For genomic researchers and clinicians, dPCR is particularly powerful in rare mutation detection, quantifying copy number variants, and Next Gen Sequencing library quantification. The potential use in clinical settings for liquid biopsy with cell free DNA and viral load quantification further increases the value of dPCR technology.

SUMMARY

Provided herein are methods and devices that may be useful for analysis of a biological sample, for example, amplifying and quantifying nucleic acids. The present disclosure provides methods, systems, and devices that may enable sample preparation, sample amplification, and sample analysis. Sample analysis may be performed through the use of digital polymerase chain reaction (dPCR). Samples may be digitized and gas in the sample may be outgassed prior to analysis. Such outgassing or otherwise removing of gas from the microfluidic device and sample may reduce gas fouling of the microfluidic device, reduce sample preparation time, and improve reproducibility of analysis. This may enable sample analysis, for example nucleic acid amplification and quantification, at a reduced cost and complexity as compared to other systems and methods.

In an aspect, the present disclosure provides a microfluidic device for processing a biological sample, comprising: a first channel configured to receive a solution comprising the biological sample; a chamber in fluid communication with the first channel, wherein the chamber is configured to receive at least a portion of the solution from the first channel; and a second channel disposed adjacent to the chamber, wherein the second channel is configured to (i) receive gas flow from the chamber upon application of a pressure differential between the chamber and the second channel and (ii) impede gas flow from the chamber in absence of the pressure differential.

In some embodiments, the second channel is not fluidically connected to the first channel or the chamber. In some embodiments, the microfluidic device does not include valves disposed between the chamber and the second channel. In some embodiments, the gas flows through a material disposed between the second channel and the chamber. In some embodiments, the first channel is separate from (e.g., spaced apart from) the second channel. In some embodiments, a distance between the chamber and the second channel is less than or equal to about 50 micrometers (μm). In some embodiments, the distance is less than or equal to about 20 μm. In some embodiments, the distance is from about 10 μm to 20 μm. In some embodiments, the chamber is one of a plurality of chambers in fluid communication with the first channel. In some embodiments, a first cross-sectional dimension of the second channel is less than or equal to about 50 μm, and a second cross-sectional dimension of the second channel is less than or equal to about 50 μm.

In some embodiments, the microfluidic device further comprises a film that seals at least one of the first channel, the chamber, and the second channel. In some embodiments, the film comprises a metallic layer. In some embodiments, the metallic layer is configured to impede gas flow through the film. In some embodiments, the metallic layer comprises one or more members selected from the group consisting of aluminum, titanium, and nickel. In some embodiments, the metallic layer comprises aluminum. In some embodiments, a thickness of the metallic layer is less than or equal to about 50 nanometers (nm). In some embodiments, a thickness of the film is less than or equal to about 100 μm. In some embodiments, the thickness is from about 50 μm to 100 μm. In some embodiments, the metallic layer is disposed on an external surface of the film. In some embodiments, the metallic layer is configured to reduce surface contamination of the film. In some embodiments, the film is substantially optically clear.

In another aspect, the present disclosure provides a method for processing a biological sample, comprising: (a) providing a device comprising (i) a first channel, (ii) a chamber in fluid communication with the first channel, and (iii) a second channel disposed adjacent to the chamber, wherein the second channel (a) receives gas flow from the chamber upon application of a pressure differential between the chamber and the second channel and (b) impedes gas flow from the chamber to the second channel in absence of the pressure differential; (b) flowing a portion of a solution comprising the biological sample from the first channel to the chamber; and (c) applying the pressure differential between the chamber and the second channel such that gas from the chamber flows to the second channel.

In some embodiments, the second channel is not fluidically connected to the first channel or the chamber. In some embodiments, the first channel is separate from (e.g., spaced apart from) the second channel. In some embodiments, the gas flows through a material disposed between the second channel and the chamber. In some embodiments, the microfluidic device does not include valves disposed between the chamber and the second channel. In some embodiments, a distance between the chamber and the second channel is less than or equal to about 50 micrometers (μm). In some embodiments, the distance is less than or equal to about 20 μm. In some embodiments, the distance is from about 10 μm to 20 μm. In some embodiments, the chamber is one of a plurality of chambers in fluid communication with the first channel. In some embodiments, a first cross-sectional dimension of the second channel is less than or equal to about 50 μm, and wherein a second cross-sectional dimension of the second channel is less than or equal to about 50 μm.

In some embodiments, the microfluidic device further comprises a film that seals at least one of the first channel, the chamber, and the second channel. In some embodiments, the film comprises a metallic layer. In some embodiments, the metallic layer impedes gas flow through the film. In some embodiments, the metallic layer comprises one or more members selected from the group consisting of aluminum, titanium, and nickel. In some embodiments, the metallic layer comprises aluminum. In some embodiments, a thickness of the metallic layer is less than or equal to about 50 nanometers (nm). In some embodiments, a thickness of the film is less than or equal to about 100 μm. In some embodiments, the thickness is from about 50 μm to 100 μm. In some embodiments, the metallic layer is disposed on an external surface of the film. In some embodiments, the metallic layer reduces surface contamination of the film. In some embodiments, the film is substantially optically clear.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 1A schematically illustrates a top view of the example microfluidic device with outgas channel (e.g., second channel); FIG. 1B schematically illustrates a cross-sectional view of the example microfluidic device with outgas channel (e.g., second channel);

FIG. 2A schematically illustrates loading a sample into the microfluidic device; FIG. 2B schematically illustrates pressurizing the microfluidic device to load the sample into the channel; FIG. 2C schematically illustrates continued pressurization to degas the fluid flow path and continue to load the sample into the channel; FIG. 2D schematically illustrates partial digitization of the sample into the chambers, loading of oil into the channel, and displacement of air; FIG. 2E schematically illustrates further digitization and displacement of air; FIG. 2F schematically illustrates complete digitization of the sample;

DETAILED DESCRIPTION

Figure 1A:
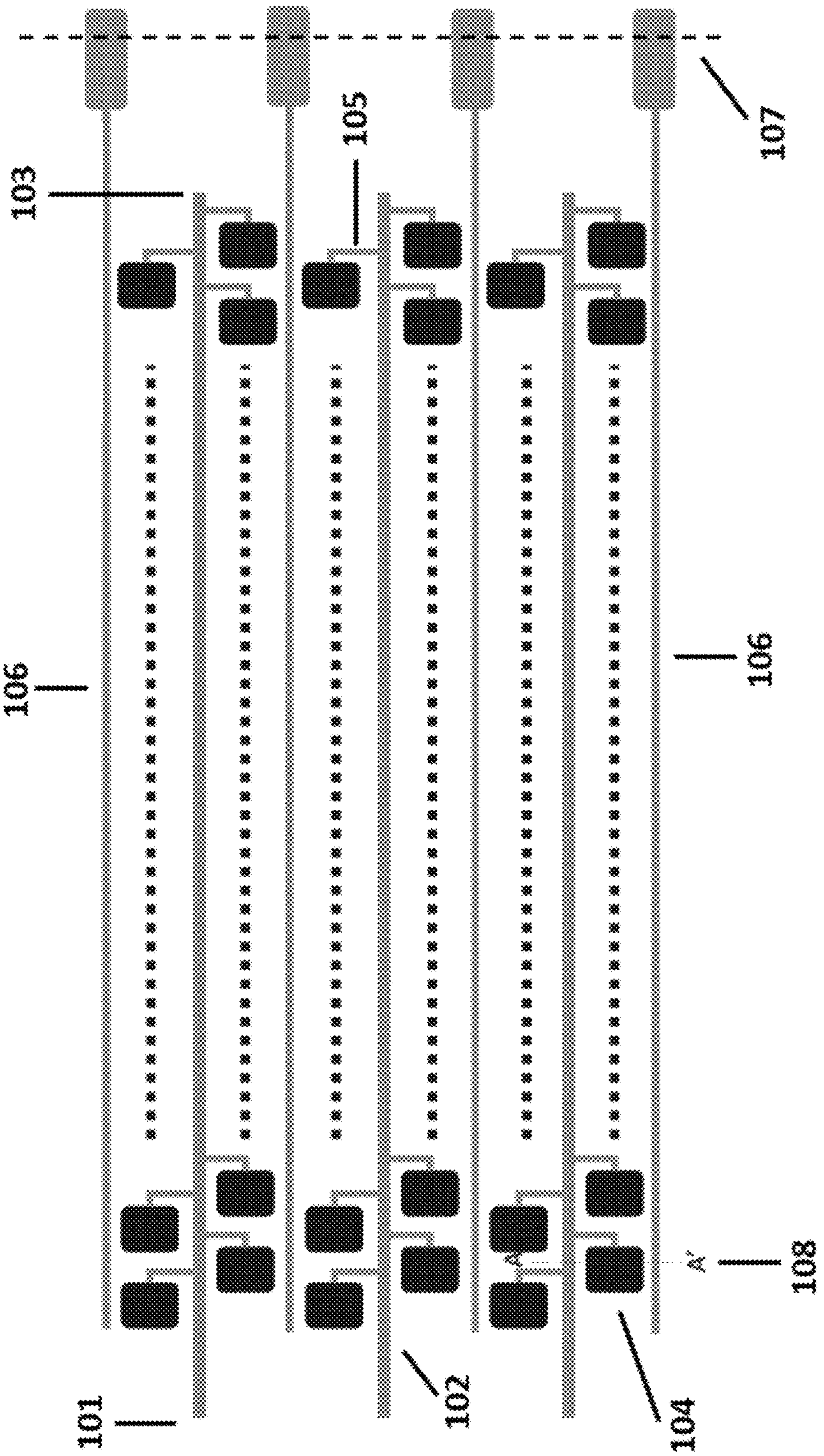
FIGS. 1A and 1B schematically illustrate an example microfluidic device with an outgas channel (e.g., second channel)

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "sample," as used herein, generally refers to any sample containing or suspected of containing a nucleic acid molecule. For example, a sample can be a biological sample containing one or more nucleic acid molecules. The biological sample can be obtained (e.g., extracted or isolated) from or include blood (e.g., whole blood), plasma, serum, urine, saliva, mucosal excretions, sputum, stool and tears. The biological sample can be a fluid or tissue sample (e.g., skin sample). In some examples, the sample is obtained from a cell-free bodily fluid, such as whole blood. In such instance, the sample may include cell-free DNA or cell-free RNA. In some examples, the sample can include circulating tumor cells. In some examples, the sample is an environmental sample (e.g., soil, waste, ambient air and etc.), industrial sample (e.g., samples from any industrial processes), and food samples (e.g., dairy products, vegetable products, and meat products). The sample may be processed prior to loading into the microfluidic device. For example, the sample may be processed to lyse cells, purify the nucleic acid molecules, or to include reagents.

As used herein, the term "fluid," generally refers to a liquid or a gas. A fluid cannot maintain a defined shape and will flow during an observable time frame to fill the container into which it is put. Thus, the fluid may have any suitable viscosity that permits flow. If two or more fluids are present, each fluid may be independently selected among any fluids (e.g., liquids, gases, and the like).

As used herein, the term "partition," generally refers to a division into or distribution into portions or shares. For example, a partitioned sample is a sample that is isolated from other samples. Examples of structures that enable sample partitioning include wells and chambers.

As used herein, the term "digitized" or "digitization" may be used interchangeable and generally refers to a sample that has been distributed into one or more partitions. A digitized sample may or may not be in fluid communication with another digitized sample. A digitized sample may not interact or exchange materials (e.g., reagents, analytes, etc.) with another digitized sample.

As used herein, the term "microfluidic," generally refers to a chip, area, device, article, or system including at least one channel, a plurality of siphon apertures, and an array of chambers. The channel may have a cross-sectional dimension less than or equal to about 10 millimeters (mm), less than or equal to about 5 mm, less than or equal to about 4 mm, less than or equal to about 3 mm, less than or equal to about 2 mm, less than or equal to about 1.5 mm, less than or equal to about 1 mm, less than or equal to about 750 micrometers (μm), less than or equal to about 500 μm, less than or equal to about 250 μm, less than or equal to about 100 μm, or less.

As used herein, the term "depth," generally refers to the distance measured from the bottom of the channel, siphon aperture, or chamber to the thin film that caps the channel, plurality of siphon apertures, and array of chambers.

As used herein, the terms "cross-section" or "cross-sectional" may be used interchangeably and generally refer to a dimension or area of a channel or siphon aperture that is substantially perpendicularly to the long dimension of the feature.

As used herein, the terms "pressurized off-gassing" or "pressurized degassing" may be used interchangeably and generally refer to removal or evacuation of a gas (e.g., air, nitrogen, oxygen, etc.) from a channel or chamber of the device (e.g., microfluidic device) to an environment external to the channel or chamber through the application of a pressure differential. The pressure differential may be applied between the channel or chamber and the environment external to the channel or chamber. The pressure differential may be provided by the application of a pressure source to one or more inlets to the device or application of a vacuum source to one or more surfaces of the device. Pressurized off-gassing or pressurized degassing may be permitted through a film or membrane covering one or more sides of the channel or chamber.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Microfluidic Devices for Processing Biological Samples

The present disclosure provides microfluidic devices for sample processing, analysis, or both. A microfluidic device of the present disclosure may be formed from a polymeric material (e.g., thermoplastic), and may include one or more of a first channel, chamber or chambers, second channel, and film sealing the first channel, chambers, second channel, or any combination thereof. The second channel (e.g., outgas channel), film, or both may permit pressurized outgassing or degassing while serving as a gas barrier when pressure is released. The microfluidic device may be a chip or cartridge. A microfluidic device of the present disclosure may be a single-use or disposable device. As an alternative, the microfluidic device may be multi-use device. The use of polymers (e.g., thermoplastics) to form the microfluidic structure may allow for the use of an inexpensive and highly scalable injection molding processes, while the second channel, film, or both may provide the ability to outgas via pressurization, avoiding fouling problems that may be present some microfluidic structures that do not incorporate such channels and films.

For example, as a microfluidic device operates on a sub-millimeter scale and handles micro-liters, nano-liters, or smaller quantities of fluids, a major fouling mechanism may be trapped air, or bubbles, inside the micro-structure. This may be particularly problematic when using a polymer material, such as a thermoplastic, to create the microfluidic structure, as the gas permeability of thermoplastics is very low. In order to avoid fouling by trapped air, other microfluidic structures use either simple straight channel or branched channel designs with thermoplastic materials, or else manufacture the device using high gas permeability materials such as elastomers. However, simple designs limit possible functionality of the microfluidic device, and elastomeric materials are both difficult and expensive to manufacture, particularly at scale.

In an aspect, the present disclosure provides a device (e.g., microfluidic device) for processing a biological sample. The microfluidic device may include a first channel. The first channel may be configured to receive or may receive a solution including the biological sample. The microfluidic device may include a chamber or a plurality of chambers. The chamber or chambers may be configured to receive and retain or may receive and retain at least a portion of the solution from the first channel during processing. The microfluidic device may include a second channel (e.g., outgas channel) disposed adjacent to the chamber or plurality of chambers. The second channel may be configured to receive or may receive gas flow from the chamber to the second channel upon application of a pressure differential between the chamber and the second channel. The second channel may be configured to impede or may impede gas flow from the chamber to the second channel in absence of the pressure differential. In an example, the microfluidic device includes a film covering the chambers, first channel, second channel or a portion of the second channel, or any combination thereof. The film may include a metallic layer.

In another aspect, the present disclosure provides device (e.g., microfluidic device) for processing a biological sample. The microfluidic device may include one or more channels. The channel may be configured to receive or may receive a solution including the biological sample. The microfluidic device may include a chamber or a plurality of chambers. The chamber or chambers may be configured to receive and retain or may receive and retain at least a portion of the solution from the channel during processing. The microfluidic device may include a film disposed adjacent to the chamber. The film may comprise a metallic layer. The film may be configured to permit or may permit gas flow from the chamber through the film to an environment external to the chamber upon application of a pressure differential between the chamber and the environment external to the chamber. Alternatively, or in addition to, the film with metallic layer may seal at least one of the chamber(s), first channel, second channel, or any combination thereof. In an example, the film with metallic layer may seal the chambers and first channel and cover a portion of the second channel.

Figure 1B:
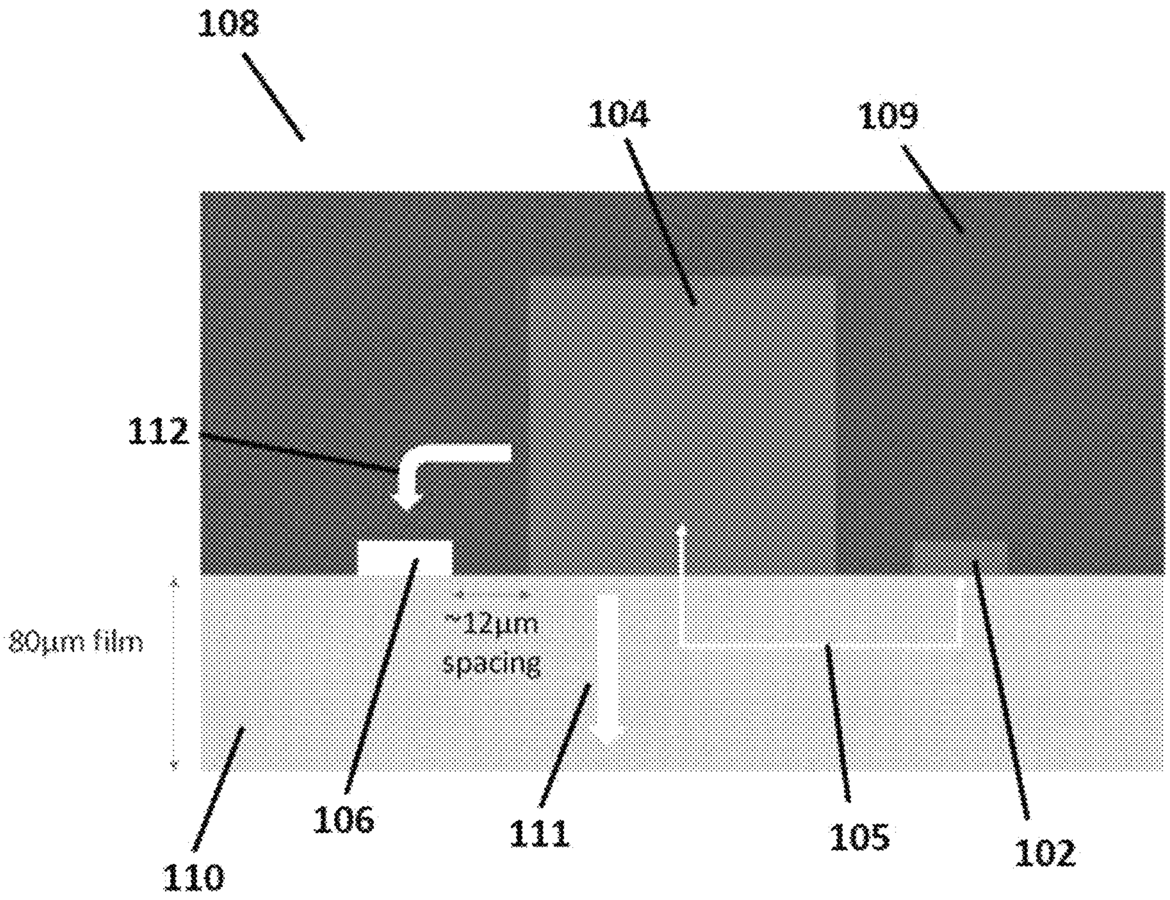

An example microfluidic device is shown in FIGS. 1A and 1B. FIG. 1A shows an example top view of the example microfluidic device. The microfluidic device may include one or more fluid flow channels 102 (e.g., first channels). The fluid flow channel 102 may include at least two ends. One end 101 of the fluid flow channel 102 may be in fluid communication with or coupled to an inlet port. The inlet port may provide sample to the fluid flow channel 102. The second end 103 of the fluid flow channel may be a dead end or an end otherwise not coupled to an inlet or outlet. The fluid flow path 102 may be in fluid communication with one or more chambers 104. In an example, the fluid flow path

102 is in fluid communication with a plurality of chambers 104. Fluid communication between the fluid flow path 102 and the chambers 104 may be provided by one or more siphon apertures 105. The chambers 104 may be disposed adjacent to one or more outgas channels (e.g., second channels). Each chamber 104 may be disposed adjacent to at least one outgas channel 106 (e.g., second channel). The microfluidic device may include more than one fluid flow channel 102 (e.g., first channel). The fluid flow channels 102 (e.g., first channels) may or may not be in fluid communication with one another. Each fluid flow channel 102 (e.g., first channel) may be in fluid communication with a set of chambers 104. The microfluidic device may include a film 110. The film may cover the fluid flow channels 102, chambers 104, and at least a portion of the outgas channel 106. An end portion of the outgas channel 106 (e.g., second channel) may be disposed at an edge of the film 107 and may be open to ambient pressures. FIG. 1B shows a cross-sectional view of the microfluidic device along the line A-A' 108. The microfluidic device may include a device body 109. The device body 109 may comprise a thermoplastic or other plastic. The device body 109 may be formed by a molding process. The device body 109 may include one or more of a fluid flow channel 102 (e.g., first channel), chamber 104, siphon aperture 105, outgas channel 106 (e.g., second channel), or any combination thereof. The microfluidic device may further include a film 110 adhered to the body 109 to seal one or more of the fluid flow channel 102 (e.g., first channel), chamber 104, siphon aperture 105, outgas channel 106 (e.g., second channel), or any combination thereof. The film 110 may provide a first gas flow pathway 111 for pressurized outgassing. Alternatively, or in addition to, the outgas channel 106 may provide a second gas flow pathway 112 for pressurized outgassing.

Figure 1C:
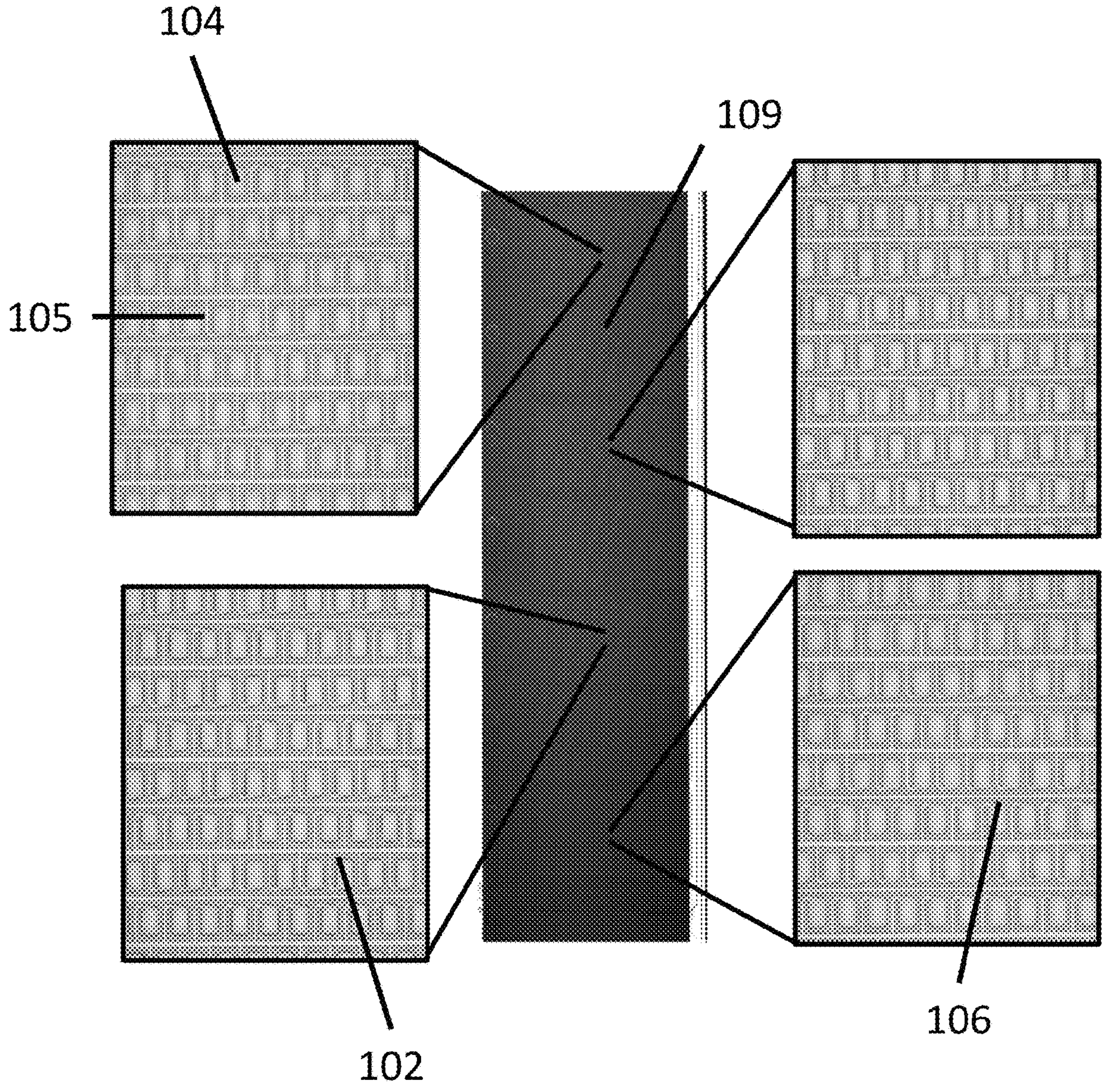
FIG. 1C depicts an example microfluidic device with an outgas channel.

FIG. 1C depicts an example of a microfluidic device as disclosed herein. The microfluidic device may comprise a device body 109 which may comprise one or more fluid flow channels 102, each of which is in fluid communication with one or more chambers 104. The chamber(s) 104 may be fluidically coupled to the fluid flow channel(s) 102 through one or more siphon apertures 105. The device may further comprise one or more outgas channels 106 disposed adjacent to one or more chambers 104.

The device (e.g., microfluidic device) may include a unit, which comprises the first channel, second channel, a chamber or plurality of chambers, or any combination thereof. The device may include at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more units. The individual units may or may not be in fluid communication with one another. In an example, the individual units are not in fluid communication with one another. The channel may be part of a fluid flow path. The fluid flow path may include the channel, one or more inlet ports, one or more outlet ports, or any combination thereof. In an example, the fluid flow path may not include an outlet port. The inlet port, outlet port, or both may be in fluid communication with the channel. The inlet port may be configured to direct a solution comprising the biological sample to the channel. The chambers may be in fluid communication with the channel.

The fluid flow path may include one first channel or multiple first channels. The fluid flow path may include at least 1, 2, 3, 4, 5, 6, 8, 10, 12, 15, 20, 25, 30, 40, 50 or more first channels. Each first channel may be fluidically isolated from one another. Alternatively, or in addition to, the multiple first channels may be in fluidic communication with one another. The first channel may include a first end and a second end. The first end and second end may be connected to a single inlet port. Alternatively, or in addition to, the first end of the first channel may be connected to an inlet port and the second end of the channel may be a dead end. A first channel with a first end and second end connected to a single inlet port may be in a circular or looped configuration such that the fluid entering the channel through the inlet port may be directed through the first end and second end of the channel simultaneously. Alternatively, the first end and second end may be connected to different inlet ports. The fluid flow path or the chamber may not include valves to stop or hinder fluid flow or to isolate the chamber(s).

The first channel may have a single inlet or multiple inlets. The inlet(s) may have the same diameter or they may have different diameters. The inlet(s) may have diameters less than or equal to about 2.5 millimeters (mm), 2 mm, 1.5 mm, 1 mm, 0.5 mm, or less.

The device may comprise a long dimension and a short dimension. The long dimension may be less than or equal to about 20 centimeters (cm), 15 cm, 10 cm, 8 cm, 6 cm, 5 cm, 4 cm, 3 cm, 2 cm, 1 cm, or less. The short dimension of the device may be less than or equal to about 10 cm, 8 cm, 6 cm, 5 cm, 4 cm, 3 cm, 2 cm, 1 cm, 0.5 cm, or less. In an example, the dimensions of the device (e.g., microfluidic device) are about 7.5 cm by 2.5 cm. The first channel may be substantially parallel to the long dimension of the microfluidic device. Alternatively, or in addition to, the first channel may be substantially perpendicular to the long dimension of the microfluidic device (e.g., parallel to the short dimension of the device). Alternatively, or in addition to, the first channel may be neither substantially parallel nor substantially perpendicular to the long dimension of the microfluidic device. The angle between the channel and the long dimension of the microfluidic device may be at least about 5°, 10°, 15°, 20°, 30°, 40°, 50°, 60°, 70°, or 90. In an example, the channel is a single long channel. Alternatively, or in addition to, the first channel may have bends, curves, or angles. In an example, the first channel may include a serpentine pattern that is configured to increase the length of the channel. The first channel may have a long dimension that is less than or equal to about 100 millimeters (mm), 75 mm, 50 mm, 40 mm, 30 mm, 20 mm, 10 mm, 8 mm, 6 mm, 4 mm, 2 mm, or less. The length of the first channel may be bounded by the external length or width of the microfluidic device. The first channel may have a depth of less than or equal to about 500 micrometers (μm), 250 μm, 100 μm, 80 μm, 60 μm, 30 μm, 20 μm, 10 μm, or less. The first channel may have a cross-sectional dimension (e.g., width or diameter) of less than or equal to about 500 μm, 250 μm, 100 μm, 75 μm, 50 μm, 40 μm, 30 μm, 20 μm, 10 μm, or less.

In some examples, the cross-sectional dimensions of the first channel may be about 100 μm wide by about 100 μm deep. In some examples, the cross-sectional dimensions of the first channel may be about 100 μm wide by about 80 μm deep. In some examples, the cross-sectional dimensions of the first channel may be about 100 μm wide by about 60 μm deep. In some examples, the cross-sectional dimensions of the first channel may be about 100 μm wide by about 40 μm deep. In some examples, the cross-sectional dimensions of the first channel may be about 100 μm wide by about 20 μm deep. In some examples, the cross-sectional dimensions of the first channel may be about 100 μm wide by about 10 μm deep. In some examples, the cross-sectional dimensions of the first channel may be about 80 μm wide by about 100 μm deep. In some examples, the cross-sectional dimensions of the first channel may be about 60 μm wide by about 100 μm deep. In some examples, the cross-sectional dimensions of the first channel may be about 40 μm wide by about 100 μm deep. In some examples, the cross-sectional dimensions of the first channel may be about 20 μm wide by about 100 μm deep. In some examples, the cross-sectional dimensions of the first channel may be about 10 μm wide by about 100 μm deep. In some examples, the cross-sectional dimensions of the first channel may be about 80 μm wide by about 80 μm deep. In some examples, the cross-sectional dimensions of the first channel may be about 60 μm wide by about 60 μm deep. In some examples, the cross-sectional dimensions of the first channel may be about 40 μm wide by about 40 μm deep. In some examples, the cross-sectional dimensions of the first channel may be about 20 μm wide by about 20 μm deep. In some examples, the cross-sectional dimensions of the first channel may be about 10 μm wide by about 10 μm deep.

The microfluidic device may include a plurality of chambers. Each chamber of the plurality of chambers may be in fluid communication with the channel (e.g., first channel). The plurality of chambers may be an array of chambers. The device may include a single array of chambers or multiple arrays of chambers, with each array of chambers fluidically isolated from the other arrays. The array of chambers may be arranged in a row, in a grid configuration, in an alternating pattern, or in any other configuration. The microfluidic device may have at least 1, 2, 3, 4, 5, 10, 15, 20, 30, 40, 50, or more arrays of chambers. The arrays of chambers may be identical or the arrays of chambers may be different (e.g., have a different number or configuration of chambers). The arrays of chambers may all have the same external dimension (e.g., the length and width of the array of chambers that encompasses all features of the array of chambers) or the arrays of chambers may have different external dimensions. An array of chambers may have a width of less than or equal to about 100 mm, 75 mm, 50 mm, 40 mm, 30 mm, 20 mm, 10 mm, 8 mm, 6 mm, 4 mm, 2 mm, 1 mm, or less. The array of chambers may have a length of greater than or equal to about 50 mm, 40 mm, 30 mm, 20 mm, 10 mm, 8 mm, 6 mm, 4 mm, 2 mm, 1 mm, or less. In an example, the width of an array may be from about 1 mm to 100 mm or from about 10 mm to 50 mm. In an example, the length of an array may be from about 1 mm to 50 mm or from about 5 mm to 20 mm.

The array of chambers may have greater than or equal to about 1,000 chambers, 5,000 chambers, 10,000 chambers, 20,000 chambers, 30,000 chambers, 40,000 chambers, 50,000 chambers, 100,000 chambers, or more. In an example, the microfluidic device may have from about 10,000 to 30,000 chambers. In another example, the microfluidic device may have from about 15,000 to 25,000 chambers. The chambers may be cylindrical in shape, hemispherical in shape, or a combination of cylindrical and hemispherical in shape. Alternatively, or in addition to, the chambers may be cubic in shape. The chambers may have a cross-sectional dimension of less than or equal to about 500 μm, 250 μm, 100 μm, 80 μm, 60 μm, 30 μm, 15 μm, or less. In an example, the chamber has a cross-sectional dimension (e.g., diameter or side length) that is less than or equal to about 250 μm. In another example, the chamber has a cross-sectional dimension (e.g., diameter or side length) that is less than or equal to about 100 μm. In another example, the chamber has a cross-sectional dimension (e.g., diameter or side length) that is less than or equal to about 50 μm.

The depth of the chambers may be less than or equal to about 500 μm, 250 μm, 100 μm, 80 μm, 60 μm, 30 μm, 15 μm, or less. In an example, the chambers may have a cross-sectional dimension of about 30 μm and a depth of about 100 μm. In another example, the chambers may have a cross-sectional dimension of about 35 μm and a depth of about 80 μm. In another example, the chambers may have a cross-sectional dimension of about 40 μm and a depth of about 70 μm. In another example, the chambers may have a cross-sectional dimension of about 50 μm and a depth of about 60 μm. In another example, the chambers may have a cross-sectional dimension of about 60 μm and a depth of about 40 μm. In another example, the chambers may have a cross-sectional dimension of about 80 μm and a depth of about 35 μm. In another example, the chambers may have a cross-sectional dimension of about 100 μm and a depth of about 30 μm. In another example, the chambers and the channel have the same depth. In an alternative embodiment, the chambers and the channel have different depths.

The chambers may have any volume. The chambers may have the same volume or the volume may vary across the microfluidic device. The chambers may have a volume of less than or equal to about 1000 picoliters (pL), 900 pL, 800 pL, 700 pL, 600 pL, 500 pL, 400 pL, 300 pL, 200 pL, 100 pL, 75 pL, 50 pL, 25 pL, or less picoliters. The chambers may have a volume from about 25 pL to 50 pL, 25 pL to 75 pL, 25 pL to 100 pL, 25 pL to 200 pL, 25 pL to 300 pL, 25 pL to 400 pL, 25 pL to 500 pL, 25 pL to 600 pL, 25 pL to 700 pL, 25 pL to 800 pL, 25 pL to 900 pL, or 25 pL to 1000 pL. In an example, the chamber(s) have a volume of less than or equal to 250 pL. In another example, the chambers have a volume of less than or equal to about 150 pL.

The volume of channel may be less than, equal to, or greater than the total volume of the chambers. In an example, the volume of the channel is less than the total volume of the chambers. The volume of the channel may be less than or equal to 95%, 90%, 80%, 70%, 60%, 50%, 40%, 30%, 20%, 10%, or less than the total volume of the chambers.

The device may further include a siphon aperture disposed between the channel and the chamber. The siphon aperture may be one of a plurality of siphon apertures connecting the channel to a plurality of chambers. The siphon aperture may be configured to provide fluid communication between the channel and the chamber. The lengths of the siphon apertures may be constant or may vary across the device (e.g., microfluidic device). The siphon apertures may have a long dimension that is less than or equal to about 150 μm, 100 μm, 50 μm, 25 μm, 10 μm, 5 μm, or less. The depth of the siphon aperture may be less than or equal to about 50 μm, 25 μm, 10 μm, 5 μm, or less. The siphon apertures may have a cross-sectional dimension of less than or equal to about 50 μm, 40 μm, 30 μm, 20 μm, 10 μm, 5 μm, or less.

The cross-sectional shape of the siphon aperture may be any suitable cross-sectional shape including, but not limited to, circular, oval, triangular, square, or rectangular. The cross-sectional area of the siphon aperture may be constant along the length of the siphon aperture. Alternatively, or in addition to, the cross-sectional area of the siphon aperture may vary along the length of the siphon aperture. The cross-sectional area of the siphon aperture may be greater at the connection to the channel than the cross-sectional area of the siphon aperture at the connection to the chamber. Alternatively, the cross-sectional area of the siphon aperture at the connection to the chamber may be greater than the cross-sectional area of the siphon aperture at the connection to the channel. The cross-sectional area of the siphon aperture may vary from about 50% to 150%, 60% to 125%, 70% to 120%, 80% to 115%, 90% to 110%, 95% to 100%, or 98% to 102%. The cross-sectional area of the siphon aperture may be less than or equal to about 2,500 $\mu m^2$, 1,000 $\mu m^2$, 750 $\mu m^2$, 500

$\mu m^2$, 250 $\mu m^2$, 100 $\mu m^2$, 75 $\mu m^2$, 50 $\mu m^2$, 25 $\mu m^2$, or less. The cross-sectional area of the siphon aperture at the connection to the channel may be less than or equal to the cross-sectional area of the channel. The cross-sectional area of the siphon aperture at the connection to the channel may be less than or equal to about 98%, 95%, 90%, 85%, 80%, 75%, 70%, 60%, 50%, 40%, 30%, 20%, 10%, 5%, 1%, 0.5%, or less of the cross-sectional area of the channel. The siphon apertures may be substantially perpendicular to the channel. Alternatively, or in addition to, the siphon apertures are not substantially perpendicular to the channel. An angle between the siphon apertures and the channel may be at least about 5°, 10°, 15°, 20°, 30°, 40°, 50°, 60°, 70°, or 90°.

The second channel (e.g., outgas channel) may not be fluidically connected to the fluid flow path (e.g., to the first channel) or the chambers. Alternatively, or in addition to, the second channel (e.g., outgas channel) may be fluidically connected to the chamber or chambers. The microfluidic device may not include valves between the second channel and the chamber or chambers. The second channel (e.g., outgas channel) may be separate from (e.g., spaced apart from) the first channel (e.g., channel fluidically connected to the chambers). The second channel (e.g., outgas channel) may be disposed adjacent to the chamber or plurality of chambers. The second channel may be separated from (e.g., spaced apart from) the chamber or chambers by a distance. The second channel (e.g., outgas channel) may be separated from (e.g., spaced apart from) the chamber or chambers by a distance of less than or equal to about 100 μm, 90 μm, 80 μm, 70 μm, 60 μm, 50 μm, 40 μm, 30 μm, 20 μm, 10 μm, or less. In an example, the distance between the second channel and the chamber or chambers may be less than or equal to 50 micrometers (μm). In another example, the distance between the second channel and the chambers may be less than or equal to about 20 μm. The second channel may be separated from (e.g., spaced apart from) the chamber or plurality of chambers by a distance from about 10 μm to 20 μm, 10 μm to 30 μm, 10 μm to 40 μm, 10 μm to 50 μm, 10 μm to 60 μm, 10 μm to 70 μm, 10 μm to 80 μm, 10 μm to 90 μm, 10 μm to 100 μm, 20 μm to 30 μm, 20 μm to 40 μm, 20 μm to 50 μm, 20 μm to 60 μm, 20 μm to 70 μm, 20 μm to 80 μm, 20 μm to 90 μm, 20 μm to 100 μm, 30 μm to 40 μm, 30 μm to 50 μm, 30 μm to 60 μm, 30 μm to 70 μm, 30 μm to 80 μm, 30 μm to 90 μm, 30 μm to 100 μm, 40 μm to 50 μm, 40 μm to 60 μm, 40 μm to 70 μm, 40 μm to 80 μm, 40 μm to 90 μm, 40 μm to 100 μm, 50 μm to 60 μm, 50 μm to 70 μm, 50 μm to 80 μm, 50 μm to 90 μm, 50 μm to 100 μm, 60 μm to 70 μm, 60 μm to 80 μm, 60 μm to 90 μm, 60 μm to 100 μm, 70 μm to 80 μm, 70 μm to 90 μm, 70 μm to 100 μm, 80 μm to 90 μm, 80 μm to 100 μm, or 90 μm to 100 μm. In an example, the distance between the second channel and the chambers is from about 10 μm to about 20 μm. The distance between the second channel and the chambers may be selected for manufacturability of the microfluidic device, air permeability of the material between the second channel and the chamber, available pressure, volume of air to outgas, time to complete partitioning of the sample and outgassing, or any combination thereof. The second channel may increase the rate of pressurized outgassing to enable faster sample partitioning and analysis as compared to a microfluidic device without a second channel.

The second channel (e.g., outgas channel) may be separated from (e.g., spaced apart from) the chamber or plurality of chambers by a material. Each chamber of the plurality of chambers may be disposed adjacent to the second channel. In an example, there are a plurality of second channels each adjacent to a plurality of chambers. The material may be configured to permit or may permit gas flow through the material upon application of a pressure differential (e.g., pressure gradient) across the material (e.g., between the chamber(s) and second channel). The material may be a portion of the body of the microfluidic device. Alternatively, or in addition to, the material may be separate from and coupled to the body of the device. The body of the device, the material, the film, or any combination thereof may be a polymer. In an example, the material is a thermoplastic. The thermoplastic that forms the body of the device or the material between the chamber and second channel may be a cycloolefin polymer, cycloolefin co-polymer, polycarbonate, polymethyl methacrylate, styrene-acrylonitrile copolymer, or other transparent or substantially transparent thermoplastic. Alternatively, or in addition to, the material may be an elastomer. In an example, the material is not an elastomer (e.g., polydimethylsiloxane). The material may be rigid or flexible. In an example, the material is rigid. The material disposed between the second channel and the chamber may be permeable to gas (e.g., air, oxygen, nitrogen, argon, etc.) above a threshold pressure differential. Below the threshold pressure differential, the material disposed between the second channel and the chamber may be impermeable or substantially impermeable. Pressurized outgassing may prevent, reduce, or avoid fouling of the microfluidic device by air and other gasses.

The material between the second channel and the chamber may be configured to employ different permeability characteristics under different applied pressure differentials. For example, the material may be gas impermeable at a first pressure differential (e.g., low pressure) and at least partially gas permeable at a second pressure differential (e.g., high pressure). The first pressure differential (e.g., low pressure differential) may be less than or equal to about 8 pounds per square inch (psi), 6 psi, 4 psi, 2 psi, 1 psi, or less. In an example, the film or membrane is substantially impermeable to gas at a pressure differential of less than 4 psi. The second pressure differential (e.g., high pressure differential) may be greater than or equal to about 1 psi, 2 psi, 4 psi, 6 psi, 8 psi, 10 psi, 12 psi 14 psi, 16 psi, 20 psi, or more. In an example, the material is substantially gas permeable at a pressure of greater than or equal to 4 psi.

The second channel (e.g., outgas channel) may have a first cross-sectional dimension (e.g., depth) and a second cross-sectional dimension (e.g., width). The first and second cross-sectional dimensions of the second channel may be the same, substantially the same, or different. In an example, the first and second cross-sectional dimensions are the same. In another example, the first and second cross-sectional dimensions are different. The first or second cross-sectional dimension may be less than or equal to less than or equal to about 100 μm, 90 μm, 80 μm, 70 μm, 60 μm, 50 μm, 40 μm, 30 μm, 20 μm, 10 μm, or less. The first or second cross-sectional dimension may be from about 10 μm to 20 μm, 10 μm to 30 μm, 10 μm to 40 μm, 10 μm to 50 μm, 10 μm to 60 μm, 10 μm to 70 μm, 10 μm to 80 μm, 10 μm to 90 μm, 10 μm to 100 μm, 20 μm to 30 μm, 20 μm to 40 μm, 20 μm to 50 μm, 20 μm to 60 μm, 20 μm to 70 μm, 20 μm to 80 μm, 20 μm to 90 μm, 20 μm to 100 μm, 30 μm to 40 μm, 30 μm to 50 μm, 30 μm to 60 μm, 30 μm to 70 μm, 30 μm to 80 μm, 30 μm to 90 μm, 30 μm to 100 μm, 40 μm to 50 μm, 40 μm to 60 μm, 40 μm to 70 μm, 40 μm to 80 μm, 40 μm to 90 μm, 40 μm to 100 μm, 50 μm to 60 μm, 50 μm to 70 μm, 50 μm to 80 μm, 50 μm to 90 μm, 50 μm to 100 μm, 60 μm to 70 μm, 60 μm to 80 μm, 60 μm to 90 μm, 60 μm to 100 μm, 70 μm to 80 μm, 70 μm to 90 μm, 70 μm to 100 μm, 80 μm to 90 μm, 80 μm to 100 μm, or 90 μm to 100 μm. In an example, the first cross-sectional dimension (e.g., depth) may be less than or equal to about 50 μm and the second cross-sectional dimension (e.g., width) may be less than or equal to about 50 μm.

The microfluidic device may include a film. The film may or may not seal the chambers, first channel, second channel, or any combination thereof. In an example, the film seals the chambers and the first channel. The film may provide a hermetic seal to the chambers, first channel, second channel, or any combination thereof. In an example, the film provides a hermetic seal to the chambers and first channel. In an example, the film covers at least a portion of the second channel. The second channel may have one or more ends that are not covered or sealed by the film and are open to the ambient environment and, therefore, ambient pressure. Alternatively, or in addition to, the film may provide a hermetic seal or be gas impermeable when a pressure differential is not applied across the film and gas permeable when a pressure differential is applied across the film. In an example, the film may cover the chambers, the first channel, and at least a portion of the second channel. Another portion of the second channel may be open an environment external to the chambers and channels. For example, an end of the second channel may be open to the environment (e.g., ambient pressure). Alternatively, or in addition to, the second channel may be sealed and may include a port to provide the pressure differential (e.g., via application of vacuum to the second channel).

The film or membrane may be a thin film. The film or membrane may be a polymer. The film may be a thermoplastic film or membrane. The film or membrane may not comprise an elastomeric material (e.g., polydimethylsiloxane). The thermoplastic film may comprise a cycloolefin polymer, cycloolefin co-polymer, polycarbonate, polymethyl methacrylate, styrene-acrylonitrile copolymer, or other transparent or substantially transparent thermoplastic. The gas permeable film or membrane may cover the fluid flow path, the channel, the chamber, or any combination thereof. In an example, the gas permeable film or membrane covers the chamber. In another example, the gas permeable film or membrane covers the chamber and the channel. The gas permeability of the film may be induced by elevated pressures. The thickness of the film or membrane may be less than or equal to about 500 micrometers (μm), 250 μm, 200 μm, 150 μm, 100 μm, 75 μm, 50 μm, 25 μm, or less. In an example, the film or membrane has a thickness of less than or equal to about 100 μm. In another example, the film or membrane has a thickness of less than or equal to about 50 μm. In another example, the film or membrane has a thickness of less than or equal to about 25 μm. The thickness of the film or membrane may be from about 10 μm to about 200 μm, 10 μm to 150 μm, or 10 μm to 100 μm. In an example, the thickness of the film or membrane is from about 25 μm to 100 μm. In another example, the thickness of the film or membrane is from about 50 μm to 100 μm. Films with thicknesses from about 50 μm to 100 μm may permit pressurized outgassing while simultaneously being thick enough to reduce or avoid film rupture. The thickness of the film may be selected by manufacturability of the film, the air permeability of the film, the volume of each chamber or partition to be out-gassed, the available pressure, or the time to complete the partitioning or digitizing process.

The film may include a metallic layer. The metallic layer may include aluminum, titanium, nickel, or any combination thereof. The metallic layer may include or may further include carbon. In an example, the metallic layer may be metallic carbon. In an example, the metallic layer comprises aluminum. The metallic layer may be disposed on any surface of the film. In an example, the metallic layer is disposed on an external surface (e.g., surface opposite of the channel or chambers) of the film. The metallic layer may be configured to reduce or prevent or may reduce or prevent surface contamination of the film layer. Contamination of the film layer may be due to dust or particles from the ambient environment. The film may be optically clear or substantially optically clear. The film with the metallic layer may be optically clear or substantially optically clear.

The metallic layer may have a thickness. The thickness of the metallic layer may be less than or equal to about 100 nanometers (nm), 90 nm, 80 nm, 70 nm, 60 nm, 50 nm, 40 nm, 30 nm, 20 nm, 10 nm, or less. In an example, the metallic layer has a thickness of less than or equal to about 50 nm. In another example, the metallic layer has a thickness of less than or equal to about 20 nm. The thickness of the metallic layer may be from about 10 nm to 20 nm, 10 nm to 30 nm, 10 nm to 40 nm, 10 nm to 50 nm, 10 nm to 60 nm, 10 nm to 70 nm, 10 nm to 80 nm, 10 nm to 90 nm, 10 nm to 100 nm, 20 nm to 30 nm, 20 nm to 40 nm, 20 nm to 50 nm, 20 nm to 60 nm, 20 nm to 70 nm, 20 nm to 80 nm, 20 nm to 90 nm, 20 nm to 100 nm, 30 nm to 40 nm, 30 nm to 50 nm, 30 nm to 60 nm, 30 nm to 70 nm, 30 nm to 80 nm, 30 nm to 90 nm, 30 nm to 100 nm, 40 nm to 50 nm, 40 nm to 60 nm, 40 nm to 70 nm, 40 nm to 80 nm, 40 nm to 90 nm, 40 nm to 100 nm, 50 nm to 60 nm, 50 nm to 70 nm, 50 nm to 80 nm, 50 nm to 90 nm, 50 nm to 100 nm, 60 nm to 70 nm, 60 nm to 80 nm, 60 nm to 90 nm, 60 nm to 100 nm, 70 nm to 80 nm, 70 nm to 90 nm, 70 nm to 100 nm, 80 nm to 90 nm, 80 nm to 100 nm, or 90 nm to 100 nm.

Method for Processing Biological Samples

In an aspect, the present disclosure provides a method for processing a biological sample. The method may include providing a device (e.g., microfluidic device) comprising a fluid flow path comprising a first channel, a chamber disposed adjacent to the chamber, and a second channel. The chamber may be one of a plurality of chambers. The second channel may permit gas flow from the chamber to the second channel upon application of a pressure differential between the chamber and the second channel and prevents gas flow from the chamber to the second channel in absence of the pressure differential. The method may include directing at least a portion of a solution comprising the biological sample from the first channel to the chamber. The method may include applying the pressure differential between the chamber and the second channel such that gas from the chamber flows to the second channel.

In another aspect, the present disclosure provides a method for processing a biological sample. The method may include providing a device (e.g., microfluidic device) comprising a fluid flow path comprising a channel, a chamber disposed adjacent to the chamber, and a film disposed adjacent to the chamber. The chamber may be one of a plurality of chambers. The film may include a metallic layer. The method may include directing at least a portion of a solution comprising the biological sample from the channel to the chamber. The method may further include applying a pressure differential between the chamber and an environment external to the chamber such that gas from the chamber flows through the film to the environment external to the chamber. Alternatively, or in addition to, the metallic layer may impede gas flow through the film.

Figure 2A:
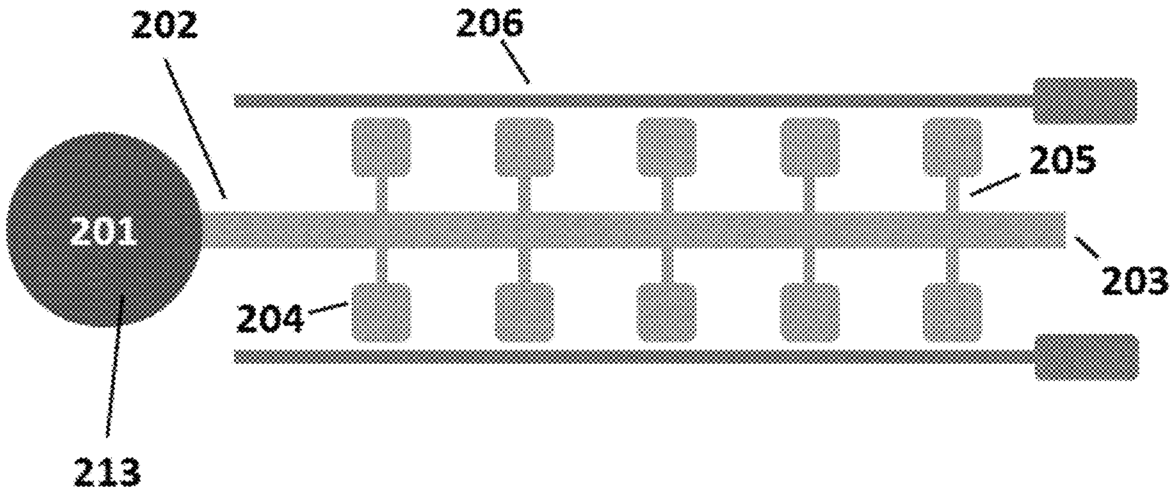
FIGS. 2A-2F schematically illustrate an example microfluidic device and method for partitioning a sample in the microfluidic device.
Figure 2B:
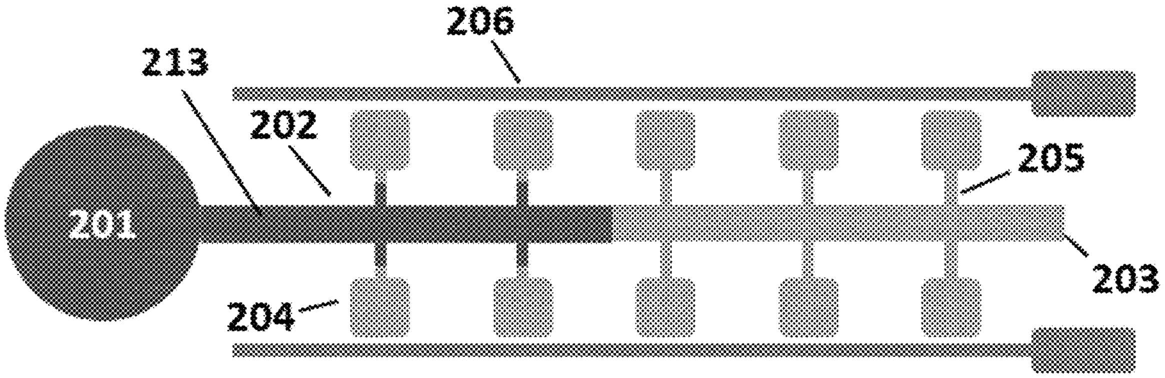
Figure 2C:
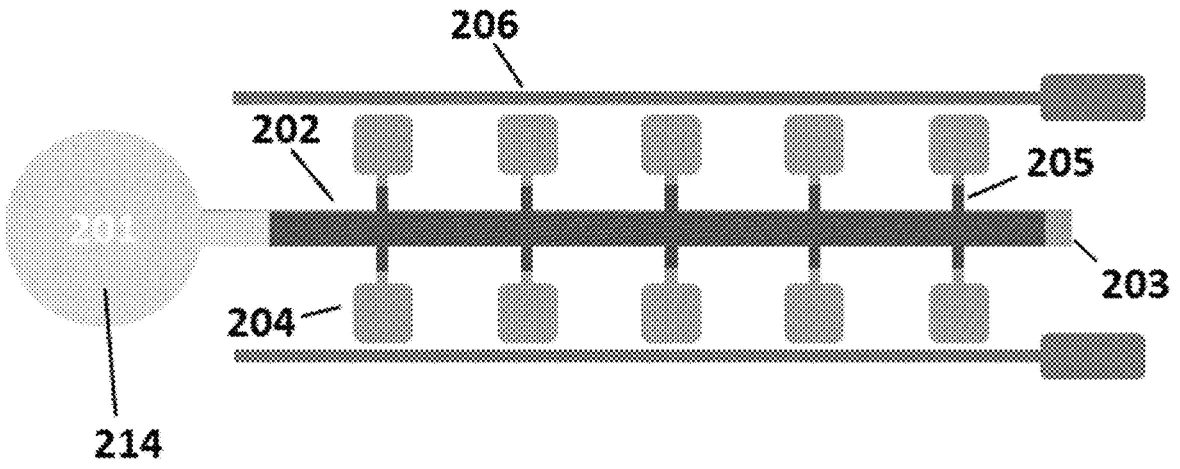
Figure 2D:
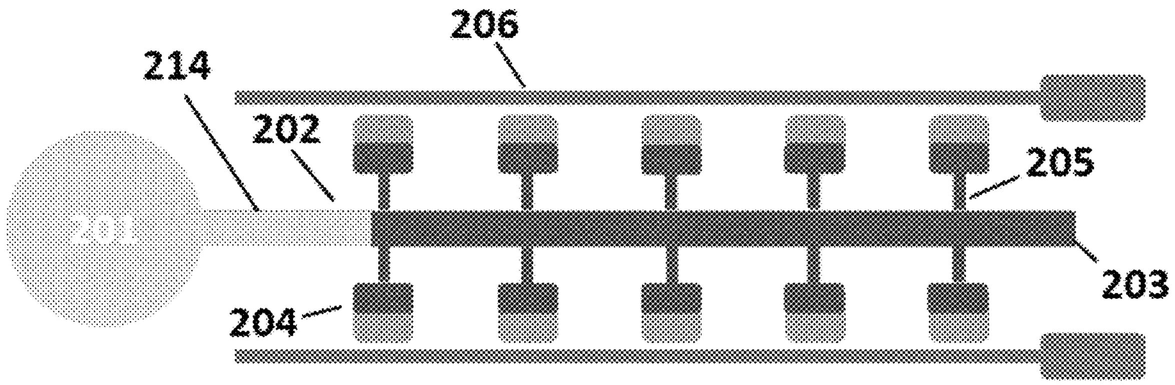
Figure 2E:
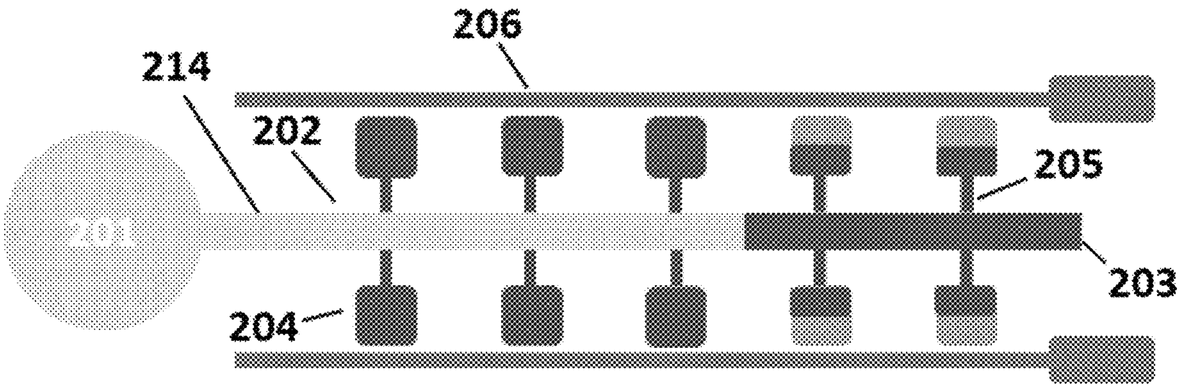
Figure 2F:
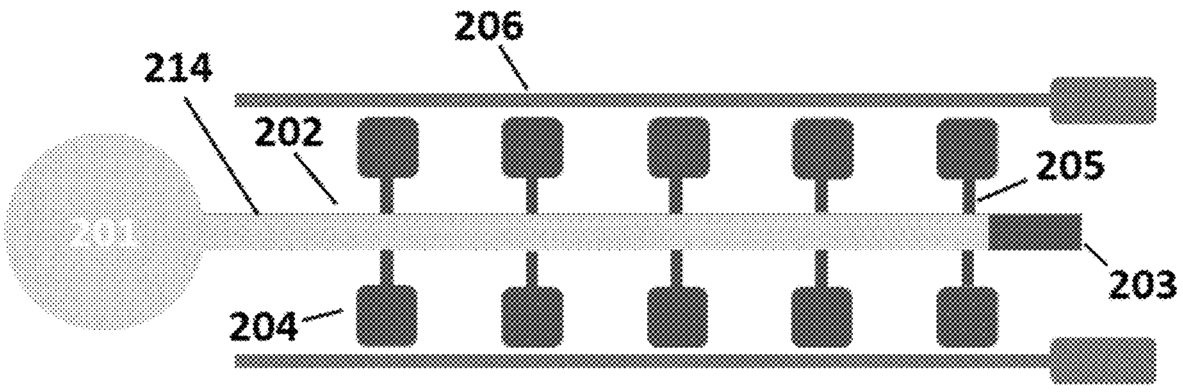

FIGS. 2A-2F schematically illustrate an example method for filling the microfluidic device. FIG. 2A schematically illustrates loading a sample 213 or a sample and an immiscible fluid into the microfluidic device. The microfluidic device may include an input port 201, first channel 202, and chambers 204. One end of the first channel 202 may include a dead end 203 or end that otherwise is not coupled to an inlet or outlet port. The first channel 202 and the chambers 204 of the microfluidic device may be filled with air. The sample 213 may be directed or injected to the input port 201. FIG. 1B schematically illustrates pressurizing the microfluidic device to load the sample 213 into the first channel 102. As pressure is applied, the sample 213 may be directed through both ends of the first channel 202 simultaneously or one end of the first channel 202 may be a dead end 203. FIG. 1C schematically illustrates continued pressurization to degas or outgas the fluid flow path and continue to load the sample into the first channel 202. As the sample 213 enters the chambers 104, a portion of the first channel 202 may be filled with an immiscible fluid 214, such as oil or gas, that may be added simultaneously with the sample or sequentially (e.g., sample followed by immiscible fluid). As the sample 213 and immiscible fluid 214 fills the first channel 202 and chambers 204, the air may be directed through the film or membrane or into the outgas channel 206 (e.g., second channel) and out of the device. FIG. 1D schematically illustrates partial digitization of the sample 213 into the chambers 204 and continued loading of the immiscible fluid 214 into the first channel 202. As the sample 213 enters the chambers 204 the air within the chambers 204 may be displaced through the film or membrane or into the outgas channel 206 (e.g., second channel). FIG. 1E schematically illustrates further digitization and displacement of air. As the immiscible fluid 214 fills the channel from both ends, sample is directed into the chambers 204 and the volume of the sample 213 within the first channel 202 is reduced; FIG. 1F schematically illustrates complete digitization of the sample 213 in which the immiscible fluid 214 fills the entire first channel 202 and the sample 213 is isolated in the chambers 204. In another example, the device has multiple inlet ports and the sample and immiscible fluid are applied to each port simultaneously to fill the channel and chambers.

Methods for processing and analyzing a biological sample may use any device as described elsewhere herein. The device may include a chamber or a plurality of chambers. The device may include a single inlet port or multiple inlet ports. In an example, the device includes a single inlet port. In another example, the device includes two or more inlet ports. The device may be as described elsewhere herein.

The method may include applying a single or multiple pressure differentials to the inlet port to direct the solution from the inlet port to the first channel. Alternatively, or in addition to, the device may include multiple inlet ports and the pressure differential may be applied to the multiple inlet ports. The inlet of the device (e.g., microfluidic device) may be in fluid communication with a fluid flow module, such as a pneumatic pump, vacuum source or compressor. The fluid flow module may provide positive or negative pressure to the inlet. The fluid flow module may apply a pressure differential to fill the device with a sample and partition (e.g., digitize) the sample into the chamber. Alternatively, or in addition to, the sample may be partitioned into a plurality of chambers as described elsewhere herein. Filling and partitioning of the sample may be performed without the use of valves between the chambers and the channel to isolate the sample. For example, filling of the channel may be performed by applying a pressure differential between the sample in the inlet port and the channel. This pressure differential may be achieved by pressurizing the sample or by applying vacuum to the channel and or chambers. Filling the chambers and partitioning the solution comprising the sample may be performed by applying a pressure differential between the channel and the chambers. This may be achieved by pressurizing the channel via the inlet port(s) or by applying a vacuum to the chambers. The solution comprising the sample may enter the chambers such that each chamber contains at least a portion of the solution.

In some cases, one single pressure differential may be used to deliver the solution with the biological sample (including molecule targets of interest) to the channel, and the same pressure differential may be used to continue to digitize (i.e., delivering the solution from the channel to the chamber) the chamber with the solution. Moreover, the single pressure differential may be sufficiently high to permit pressurized off-gassing or degassing of the channel or chamber. Alternatively, or in additional to, the pressure differential to deliver the solution with sample to the channel may be a first pressure differential. The pressure differential to deliver the solution from the channel to the chamber(s) may be a second pressure differential. The first and second pressure differentials may be the same or may be different. In an example, the second pressure differential is greater than the first pressure differential. Alternatively, the second pressure differential may be less than the first pressure differential. The first pressure differential, the second pressure differential, or both may be sufficiently high to permit pressurized off-gassing or degassing of the channel or chamber. In some cases, a third pressure differential may be used to permit pressurized off-gassing or degassing of the first channel, chambers, or both. Pressurized off-gassing or degassing of the first channel or chamber(s) may be permitted by the second channel or film or membrane. For example, when a pressure threshold is reached the film or membrane may permit gas to travel from the chamber, the first channel, or both the chamber and the first channel through the film or membrane to an environment outside of the chamber or first channel.

The second channel or film or membrane may employee different permeability characteristics under different applied pressure differentials. For example, the second channel or film or membrane may be gas impermeable at the first pressure differential (e.g., low pressure) and gas permeable at the second pressure differential (e.g., high pressure). The first and second pressure differentials may be the same or they may be different. During filling of the microfluidic device, the pressure of the inlet port may be higher than the pressure of the first channel, permitting the solution in the inlet port to enter the channel. The first pressure differential (e.g., low pressure) may be less than or equal to about 8 psi, 6 psi, 4 psi, 2 psi, 1 psi, or less. In an example, the first pressure differential may be from about 1 psi to 8 psi. In another example, the first pressure differential may be from about 1 psi to 6 psi. In another example, the first pressure differential may be from about 1 psi to 4 psi. The chambers of the device may be filled by applying a second pressure differential between inlet and the chambers. The second pressure differential may direct fluid from the first channel into the chambers and gas from the first channel or chambers to an environment external to the first channel or chambers. The second pressure differential may be greater than or equal to about 1 psi, 2 psi, 4 psi, 6 psi, 8 psi, 10 psi, 12 psi 14 psi, 16 psi, 20 psi, or more. In an example, the second pressure differential is greater than about 4 psi. In another example, the second pressure differential is greater than about 8 psi. The and the microfluidic device may be filled and the sample partitioned by applying the first pressure differential, second pressure differential, or a combination thereof for less than or equal to about 20 minutes, 15 minutes, 10 minutes, 5 minutes, 3 minutes, 2 minutes, 1 minute, or less.

The sample may be partitioned by removing the excess sample from the first channel by backfilling the channel with a gas or a fluid immiscible with an aqueous solution comprising the biological sample. The immiscible fluid may be provided after providing the solution comprising the sample such that the solution enters the channel first followed by the immiscible fluid. The immiscible fluid may be any fluid that does not mix with an aqueous fluid. The gas may be oxygen, nitrogen, carbon dioxide, air, a noble gas, or any combination thereof. The immiscible fluid may be an oil or an organic solvent. For example, the immiscible fluid may be silicone oil or other types of oil/organic solvent that have similar characteristics compared to the silicone oil. Alternatively, removing sample from the channel may prevent reagents in one chamber from diffusing through the siphon aperture into the channel and into other chambers. Sample within the channel may be removed by partitioning the sample into the chambers such that no sample remains in the channel or by removing excess sample form the first channel.

Directing the solution from the first channel to the chamber or chambers may partition the sample. The device may permit partitioning of the sample into the chambers, or digitizing the samples, such that no residual solution remains in the channel or siphon apertures (e.g., such that there is no or substantially no sample dead volume). The solution comprising the sample may be partitioned such that there is zero or substantially zero sample dead volume (e.g., all sample and reagent input into the device are fluidically isolated within the chambers), which may prevent or reduce waste of sample and reagents. Alternatively, or in addition to, the sample may be partitioned by providing a sample volume that is less than a volume of the chamber(s). The volume of the first channel may be less than the total volume of the chambers such that all sample loaded into the first channel is distributed to the chambers. The total volume of the solution comprising the sample may be less than the total volume of the chambers. The volume of the solution may be 100%, 99%, 98%, 95%, 90%, 85%, 80%, or less than the total volume of the chambers. The solution may be added to the inlet port simultaneously with or prior to a gas or immiscible fluid being added to the inlet port. The volume of the gas or immiscible fluid may be greater than or equal to the volume of the first channel to fluidically isolate the chambers. A small amount of the gas or immiscible fluid may enter the siphon apertures or chambers.

Figure 3:
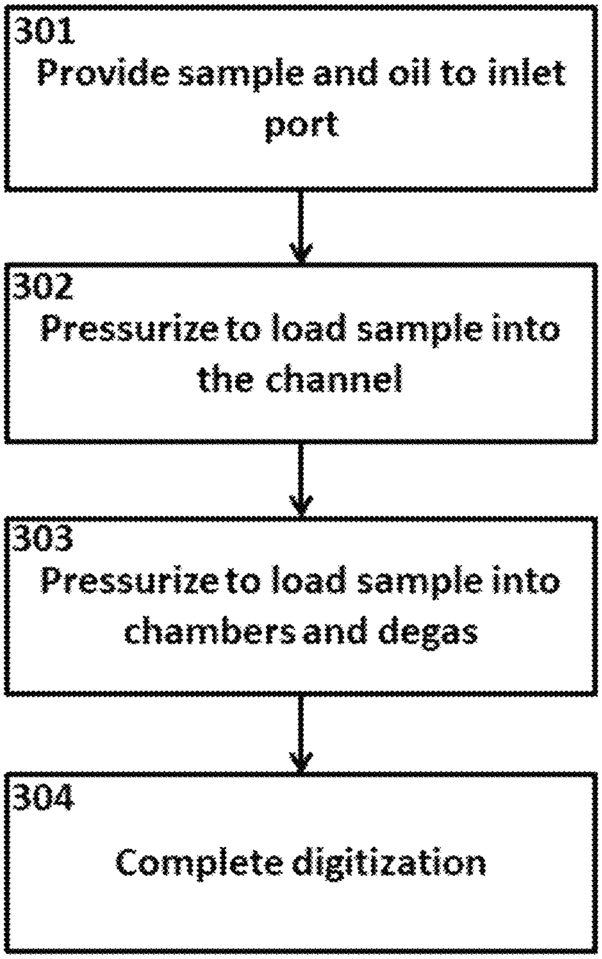
FIG. 3 schematically illustrates an example method for digitization of a sample.

FIG. 3 schematically illustrates an example method for digitization of a sample. A sample and immiscible fluid may be provided 301 at the inlet port(s) of the microfluidic device. The inlet port(s) may be pressurized 302 to load the sample and immiscible fluid into the channel. The inlet port may be further pressurized to load the sample into the chambers and fill the channel with the immiscible fluid to provide complete digitization of the sample 304.

Partitioning of the sample may be verified by the presence of an indicator within the reagent. An indicator may include a molecule comprising a detectable moiety. The detectable moiety may include radioactive species, fluorescent labels, chemiluminescent labels, enzymatic labels, colorimetric labels, or any combination thereof. Non-limiting examples of radioactive species include $^{3}H$, $^{14}C$, $^{22}Na$, $^{32}P$, $^{33}P$, $^{35}S$, $^{42}K$, $^{45}Ca$, $^{59}Fe$, $^{123}I$, $^{124}I$, $^{125}I$, $^{131}I$, or $^{203}Hg$. Non-limiting examples of fluorescent labels include fluorescent proteins, optically active dyes (e.g., a fluorescent dye), organometallic fluorophores, or any combination thereof. Non-limiting examples of chemiluminescent labels include enzymes of the luciferase class such as Cypridina, Gaussia, Renilla, and Firefly luciferases. Non-limiting examples of enzymatic labels include horseradish peroxidase (HRP), alkaline phosphatase (AP), beta galactosidase, glucose oxidase, or other types of labels.

The indicator molecule may be a fluorescent molecule. Fluorescent molecules may include fluorescent proteins, fluorescent dyes, and organometallic fluorophores. In some embodiments, the indicator molecule is a protein fluorophore. Protein fluorophores may include green fluorescent proteins (GFPs, fluorescent proteins that fluoresce in the green region of the spectrum, generally emitting light having a wavelength from 500-550 nanometers), cyan-fluorescent proteins (CFPs, fluorescent proteins that fluoresce in the cyan region of the spectrum, generally emitting light having a wavelength from 450-500 nanometers), red fluorescent proteins (RFPs, fluorescent proteins that fluoresce in the red region of the spectrum, generally emitting light having a wavelength from 600-650 nanometers). Non-limiting examples of protein fluorophores include mutants and spectral variants of AcGFP, AcGFP1, AmCyan, AmCyan1, AQ143, AsRed2, Azami Green, Azurite, BFP, Cerulean, CFP, CGFP, Citrine, copGFP, CyPet, dKeima-Tandem, DsRed, dsRed-Express, DsRed-Monomer, DsRed2, dTomato, dTomato-Tandem, EBFP, EBFP2, ECFP, EGFP, Emerald, EosFP, EYFP, GFP, HcRed-Tandem, HcRedl, JRed, Katuska, Kusabira Orange, Kusabira Orange2, mApple, mBanana, mCerulean, mCFP, mCherry, mCitrine, mECFP, mEmerald, mGrapel, mGrape2, mHoneydew, Midori-Ishi Cyan, mKeima, mKO, mOrange, mOrange2, mPlum, mRaspberry, mRFP1, mRuby, mStrawberry, mTagBFP, mTangerine, mTeal, mTomato, mTurquoise, mWasabi, PhiYFP, ReAsH, Sapphire, Superfolder GFP, T-Sapphire, TagCFP, TagGFP, TagRFP, TagRFP-T, TagYFP, tdTomato, Topaz, TurboGFP, Venus, YFP, YPet, ZsGreen, and ZsYellow1.

The indicator molecule may be a fluorescent dye. Non-limiting examples of fluorescent dyes include SYBR green, SYBR blue, DAPI, propidium iodine, Hoeste, SYBR gold, ethidium bromide, acridines, proflavine, acridine orange, acriflavine, fluorcoumanin, ellipticine, daunomycin, chloroquine, distamycin D, chromomycin, homidium, mithramycin, ruthenium polypyridyls, anthramycin, phenanthridines and acridines, ethidium bromide, propidium iodide, hexidium iodide, dihydroethidium, ethidium homodimer-1 and -2, ethidium monoazide, and ACMA, Hoechst 33258, Hoechst 33342, Hoechst 34580, DAPI, acridine orange, 7-AAD, actinomycin D, LDS751, hydroxystilbamidine, SYTOX Blue, SYTOX Green, SYTOX Orange, POPO-1, POPO-3, YOYO-1, YOYO-3, TOTO-1, TOTO-3, JOJO-1, LOLO-1, BOBO-1, BOBO-3, PO-PRO-1, PO-PRO-3, BO-PRO-1, BO-PRO-3, TO-PRO-1, TO-PRO-3, TO-PRO-5, JO-PRO-1, LO-PRO-1, YO-PRO-1, YO-PRO-3, PicoGreen, OliGreen, RiboGreen, SYBR Gold, SYBR Green I, SYBR Green II, SYBR DX, SYTO-40, -41, -42, -43, -44, -45 (blue), SYTO-13, -16, -24, -21, -23, -12, -11, -20, -22, -15, -14, -25 (green), SYTO-81, -80, -82, -83, -84, -85 (orange), SYTO-64, -17, -59, -61, -62, -60, -63 (red), fluorescein, fluorescein isothiocyanate (FITC), tetramethyl rhodamine isothiocyanate (TRITC), rhodamine, tetramethyl rhodamine, R-phycoerythrin, Cy-2, Cy-3, Cy-3.5, Cy-5, Cy5.5, Cy-7, Texas Red, Phar-Red, allophycocyanin (APC), Sybr Green I, Sybr Green II, Sybr Gold, CellTracker Green, 7-AAD, ethidium homodimer I, ethidium homodimer II, ethidium homodimer III, ethidium bromide, umbelliferone, eosin, green fluorescent protein, erythrosin, coumarin, methyl coumarin, pyrene, malachite green, stilbene, lucifer yellow, cascade blue, dichlorotriazinylamine fluorescein, dansyl chloride, fluorescent lanthanide complexes such as those including europium and terbium, carboxy tetrachloro fluorescein, 5 or 6-carboxy fluorescein (FAM), 5- (or 6-) iodoacetamidofluorescein, 5-{[2 (and 3)-5-(Acetylmercapto)-succinyl]amino} fluorescein (SAMSA-fluorescein), lissamine rhodamine B sulfonyl chloride, 5 or 6 carboxy rhodamine (ROX), 7-amino-methyl-coumarin, 7-Amino-4-methylcoumarin-3-acetic acid (AMCA), BODIPY fluorophores, 8-methoxypyrene-1,3,6-trisulfonic acid trisodium salt, 3,6-Disulfonate-4-amino-naphthalimide, phycobiliproteins, AlexaFluor 350, 405, 430, 488, 532, 546, 555, 568, 594, 610, 633, 635, 647, 660, 680, 700, 750, and 790 dyes, DyLight 350, 405, 488, 550, 594, 633, 650, 680, 755, and 800 dyes, or other fluorophores.

The indicator molecule may be an organometallic fluorophore. Non limiting examples of organometallic fluorophores include lanthanide ion chelates, nonlimiting examples of which include tris (dibenzoylmethane) mono (1,10-phenanthroline) europium(lll), tris (dibenzoylmethane) mono(5-amino-1,10-phenanthroline) europium (lll), and Lumi4-Tb cryptate.

The method may further include detecting one or more components of the solution, one or more components of the biological sample, or a reaction with one or more components of the biological sample. Detecting the one or more components of the solution, one or more components of the biological sample or the reaction may include imaging the chamber. The images may be taken of the microfluidic device. Images may be taken of single chambers, an array of chambers, or of multiple arrays of chambers concurrently. The images may be taken through the body of the microfluidic device. The images may be taken through the film or membrane of the microfluidic device. In an example, the images are taken through both the body of the microfluidic device and through the thin film. The body of the microfluidic device may be substantially optically transparent. Alternatively, the body of the microfluidic device may substantially optically opaque. In an example, the film or membrane may be substantially optically transparent. The images may be taken prior to filling the microfluidic device with sample. The Images may be taken after filling of the microfluidic device with sample. The images may be taken during filling the microfluidic device with sample. The images may be taken to verify partitioning of the sample. The images may be taken during a reaction to monitor products of the reaction. In an example, the products of the reaction comprise amplification products. The images may be taken at specified intervals. Alternatively, or in addition to, a video may be taken of the microfluidic device. The specified intervals may include taking an image at least about every 300 seconds, 240 seconds, 180 seconds, 120 seconds, 90 seconds, 60 seconds, 30 seconds, 15 seconds, 10 seconds, 5 seconds, 4 seconds, 3 seconds, 2 seconds, 1 second, or more frequently during a reaction.

The biological sample may be any biological analyte such as, but not limited to, a nucleic acid molecule, protein, enzyme, antibody, or other biological molecule. In an example, the biological sample includes one or more nucleic acid molecules. Processing the nucleic acid molecules may further include thermal cycling the chamber or chambers to amplify the nucleic acid molecules. The method may further include controlling a temperature of the channel or the chamber(s). The method for using a microfluidic device may further comprise amplification of a nucleic acid sample. The microfluidic device may be filled with an amplification reagent comprising nucleic acid molecules, components used for an amplification reaction, an indicator molecule, and an amplification probe. The amplification may be performed by thermal cycling the plurality of chambers. Detection of nucleic acid amplification may be performed by imaging the chambers of the microfluidic device. The nucleic acid molecules may be quantified by counting the chambers in which the nucleic acid molecules are successfully amplified and applying Poisson statistics. In some embodiments, nucleic acid amplification and quantification may be performed in a single integrated unit.

A variety of nucleic acid amplification reactions may be used to amplify the nucleic acid molecule in a sample to generate an amplified product. Amplification of a nucleic acid target may be linear, exponential, or a combination thereof. Non-limiting examples of nucleic acid amplification methods include primer extension, polymerase chain reaction, reverse transcription, isothermal amplification, ligase chain reaction, helicase-dependent amplification, asymmetric amplification, rolling circle amplification, and multiple displacement amplification. In some embodiments, the amplification product is DNA or RNA. For embodiments directed towards DNA amplification, any DNA amplification method may be employed. DNA amplification methods include, but are not limited to, PCR, real-time PCR, assembly PCR, asymmetric PCR, digital PCR, dial-out PCR, helicase-dependent PCR, nested PCR, hot start PCR, inverse PCR, methylation-specific PCR, miniprimer PCR, multiplex PCR, overlap-extension PCR, thermal asymmetric interlaced PCR, touchdown PCR, and ligase chain reaction. In some embodiments, DNA amplification is linear, exponential, or any combination thereof. In some embodiments, DNA amplification is achieved with digital PCR (dPCR).

Reagents used for nucleic acid amplification may include polymerizing enzymes, reverse primers, forward primers, and amplification probes. Examples of polymerizing enzymes include, without limitation, nucleic acid polymerase, transcriptase, or ligase (i.e., enzymes which catalyze the formation of a bond). The polymerizing enzyme can be naturally occurring or synthesized. Examples of polymerases include a DNA polymerase, and RNA polymerase, a thermostable polymerase, a wild-type polymerase, a modified polymerase, *E. coli* DNA polymerase I, T7 DNA polymerase, bacteriophage T4 DNA polymerase (D29 (phi29) DNA polymerase, Taq polymerase, Tth polymerase, Tli polymerase, Pfu polymerase Pwo polymerase, VENT polymerase, DEEPVENT polymerase, Ex-Taq polymerase, LA-Taw polymerase, Sso polymerase Poc polymerase, Pab polymerase, Mth polymerase ES4 polymerase, Tru polymerase, Tac polymerase, Tne polymerase, Tma polymerase, Tea polymerase, Tih polymerase, Tfi polymerase, Platinum Taq polymerases, Tbr polymerase, Tfl polymerase, Pfutubo polymerase, Pyrobest polymerase, KOD polymerase, Bst polymerase, Sac polymerase, Klenow fragment polymerase with 3' to 5' exonuclease activity, and variants, modified products and derivatives thereof. For a Hot Start polymerase, a denaturation cycle at a temperature from about 92° C. to 95° C. for a time period from about 2 minutes to 10 minutes may be used.

The amplification probe may be a sequence-specific oligonucleotide probe. The amplification probe may be optically active when hybridized with an amplification product. In some embodiments, the amplification probe is or becomes detectable as nucleic acid amplification progresses. The intensity of the optical signal may be proportional to the amount of amplified product. A probe may be linked to any of the optically-active detectable moieties (e.g., dyes)

described herein and may also include a quencher capable of blocking the optical activity of an associated dye. Non-limiting examples of probes that may be useful as detectable moieties include TaqMan probes, TaqMan Tamara probes, TaqMan MGB probes, Lion probes, locked nucleic acid probes, or molecular beacons. Non-limiting examples of quenchers that may be useful in blocking the optical activity of the probe include Black Hole Quenchers (BHQ), Iowa Black FQ and RQ quenchers, or Internal ZEN Quenchers. Alternatively, or in addition to, the probe or quencher may be any probe that is useful in the context of the methods of the present disclosure.

The amplification probe is a dual labeled fluorescent probe. The dual labeled probe may include a fluorescent reporter and a fluorescent quencher linked with a nucleic acid. The fluorescent reporter and fluorescent quencher may be positioned in close proximity to each other. The close proximity of the fluorescent reporter and fluorescent quencher may block the optical activity of the fluorescent reporter. The dual labeled probe may bind to the nucleic acid molecule to be amplified. During amplification, the fluorescent reporter and fluorescent quencher may be cleaved by the exonuclease activity of the polymerase. Cleaving the fluorescent reporter and quencher from the amplification probe may cause the fluorescent reporter to regain its optical activity and enable detection. The dual labeled fluorescent probe may include a 5' fluorescent reporter with an excitation wavelength maximum of at least about 450 nanometers (nm), 500 nm, 525 nm, 550 nm, 575 nm, 600 nm, 625 nm, 650 nm, 675 nm, 700 nm, or higher and an emission wavelength maximum of about 500 nm, 525 nm, 550 nm, 575 nm, 600 nm, 625 nm, 650 nm, 675 nm, 700 nm, or higher. The dual labeled fluorescent probe may also include a 3' fluorescent quencher. The fluorescent quencher may quench fluorescent emission wavelengths between about 380 nm and 550 nm, 390 nm and 625 nm, 470 nm and 560 nm, 480 nm and 580 nm, 550 nm and 650 nm, 550 nm and 750 nm, or 620 nm and 730 nm.

The nucleic acid amplification may be performed by thermal cycling the chambers of the microfluidic device. Thermal cycling may include controlling the temperature of the microfluidic device by applying heating or cooling to the microfluidic device. Heating or cooling methods may include resistive heating or cooling, radiative heating or cooling, conductive heating or cooling, convective heating or cooling, or any combination thereof. Thermal cycling may include cycles of incubating the chambers at a temperature sufficiently high to denature nucleic acid molecules for a duration followed by incubation of the chambers at an extension temperature for an extension duration. Denaturation temperatures may vary depending upon, for example, the particular nucleic acid sample, the reagents used, and the reaction conditions. A denaturation temperature may be from about 80° C. to 110° C. 85° C. to about 105° C., 90° C. to about 100° C., 90° C. to about 98° C., 92° C. to about 95° C. The denaturation temperature may be at least about 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C., or higher.

The duration for denaturation may vary depending upon, for example, the particular nucleic acid sample, the reagents used, and the reaction conditions. The duration for denaturation may be less than or equal to about 300 seconds, 240 seconds, 180 seconds, 120 seconds, 90 seconds, 60 seconds, 55 seconds, 50 seconds, 45 seconds, 40 seconds, 35 seconds, 30 seconds, 25 seconds, 20 seconds, 15 seconds, 10 seconds, 5 seconds, 2 seconds, or 1 second.

Extension temperatures may vary depending upon, for example, the particular nucleic acid sample, the reagents used, and the reaction conditions. An extension temperature may be from about 30° C. to 80° C., 35° C. to 75° C., 45° C. to 65° C., 55° C. to 65° C., or 40° C. to 60° C. An extension temperature may be at least about 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., or 80° C.

Extension time may vary depending upon, for example, the particular nucleic acid sample, the reagents used, and the reaction conditions. In some embodiments, the duration for extension may be less than or equal to about 300 seconds, 240 seconds, 180 seconds, 120 seconds, 90 seconds, 60 seconds, 55 seconds, 50 seconds, 45 seconds, 40 seconds, 35 seconds, 30 seconds, 25 seconds, 20 seconds, 15 seconds, 10 seconds, 5 seconds, 2 seconds, or 1 second. In an alternative embodiment, the duration for extension may be no more than about 120 seconds, 90 seconds, 60 seconds, 55 seconds, 50 seconds, 45 seconds, 40 seconds, 35 seconds, 30 seconds, 25 seconds, 20 seconds, 15 seconds, 10 seconds, 5 seconds, 2 seconds, or 1 second. In an example, the duration for the extension reaction is less than or equal to about 10 seconds.

Nucleic acid amplification may include multiple cycles of thermal cycling. Any suitable number of cycles may be performed. The number of cycles performed may be more than about 5, 10, 15, 20, 30, 40, 50, 60, 70, 80, 90, 100 cycles, or more. The number of cycles performed may depend upon the number of cycles to obtain detectable amplification products. For example, the number of cycles to detect nucleic acid amplification during dPCR may be less than or equal to about 100, 90, 80, 70, 60, 50, 40, 30, 20, 15, 10, 5 cycles, or less. In an example, less than or equal to about 40 cycles are used and the cycle time is less than or equal to about 20 minutes.

The time to reach a detectable amount of amplification product may vary depending upon the particular nucleic acid sample, the reagents used, the amplification reaction used, the number of amplification cycles used, and the reaction conditions. In some embodiments, the time to reach a detectable amount of amplification product may be about 120 minutes or less, 90 minutes or less, 60 minutes or less, 50 minutes or less, 40 minutes or less, 30 minutes or less, 20 minutes or less, 10 minutes or less, or 5 minutes or less. In an example, a detectable amount of amplification product may be reached in less than 20 minutes.

Figure 4:
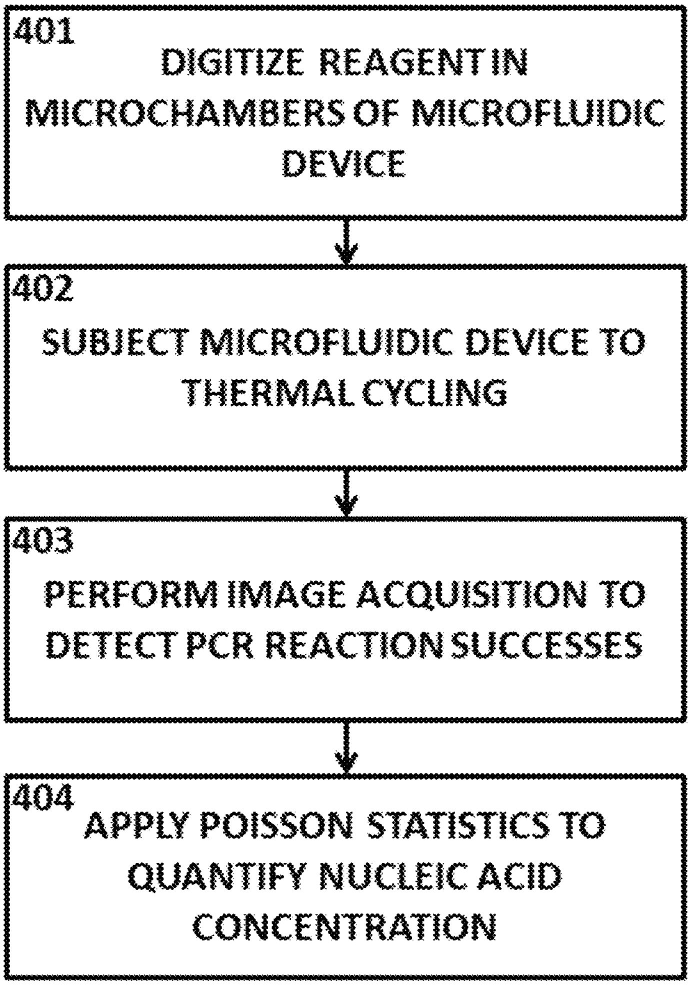
FIG. 4 schematically illustrates an example method for digital polymerase chain reaction (dPCR)

FIG. 4 schematically illustrates an example method for using the microfluidic device for a digital polymerase chain reaction (dPCR). The sample and reagents may be partitioned 401 as shown in FIGS. 2A-2F. The sample and reagent may be subjected to thermal cycling 402 to run the PCR reaction on the reagent in the chambers. Thermal cycling may be performed, for example, using a flat block thermal cycler. Image acquisition 403 may be performed to determine which chambers have successfully run the PCR reaction. Image acquisition may, for example, be performed using a three-color probe detection unit. Poisson statistics may be applied 404 to the count of chambers determined in 403 to convert the raw number of positive chambers into a nucleic acid concentration.

Systems for Processing or Analyzing Biological Samples

In an aspect, the present disclosure may provide systems for processing a biological sample. The system may include a device (e.g., microfluidic device), a holder, and a fluid flow channel. The system may be used with any device or may implement any method described elsewhere herein. The holder may be configured to receive and retain the device during processing. The fluid flow module may be configured to fluidically couple to the inlet port and supply a pressure differential to subject the solution to flow from the inlet port to the channel. Additionally, the fluid flow module may be configured to supply a pressure differential to subject at least a portion of the solution to flow from the first channel to the chamber.

The holder may be a shelf, receptacle, or stage for holding the device. In an example, the holder is a transfer stage. The transfer stage may be configured input the microfluidic device, hold the microfluidic device, and output the microfluidic device. The microfluidic device may be any device described elsewhere herein. The transfer stage may be stationary in one or more coordinates. Alternatively, or in addition to, the transfer stage may be capable of moving in the X-direction, Y-direction, Z-direction, or any combination thereof. The transfer stage may be capable of holding a single microfluidic device. Alternatively, or in addition to, the transfer stage may be capable of holding at least 2, 3, 4, 5, 6, 7, 8, 9, 10, or more microfluidic devices.

The fluid flow module may be a pneumatic module, a vacuum module, or both. The fluid flow module may be configured to be in fluid communication with the inlet port(s) of the microfluidic device. The fluid flow module may have multiple connection points capable of connecting to multiple inlet port(s). The fluid flow module may be able to fill, backfill, and partition a single array of chambers at a time or multiple arrays of chambers in tandem. The fluid flow module may be a pneumatic module combined with a vacuum module. The fluid flow module may provide increased pressure to the microfluidic device or provide vacuum to the microfluidic device.

The system may further comprise a thermal module. The thermal module may be configured to be in thermal communication with the chambers of the microfluidic devices. The thermal module may be configured to control the temperature of a single array of chambers or to control the temperature of multiple arrays of chambers. Each array of chambers may be individually addressable by the thermal module. For example, thermal module may perform the same thermal program across all arrays of chambers or may perform different thermal programs with different arrays of chambers. The thermal module may be in thermal communication with the microfluidic device or the chambers of the microfluidic device. The thermal module may heat or cool the microfluidic device. One or more surfaces of the microfluidic device may be in direct contact with the thermal module. Alternately, or in addition to, a thermally conductive material may be disposed between the thermal module and the microfluidic device. The thermal module may maintain the temperature across a surface of the microfluidic device such that the variation is less than or equal to about 2° C., 1.5° C., 1° C., 0.9° C., 0.8° C., 0.7° C., 0.6° C., 0.5° C., 0.4° C., 0.3° C., 0.2° C., 0.1° C., or less. The thermal module may maintain a temperature of a surface of the microfluidic device that is within about plus or minus 0.5° C., 0.4° C., 0.3° C., 0.2° C., 0.1° C., 0.05° C., or closer to a temperature set point.

The system may further include a detection module. The detection module may provide electronic or optical detection. In an example, the detection module is an optical module providing optical detection. The optical module may be configured to emit and detect multiple wavelengths of light. Emission wavelengths may correspond to the excitation wavelengths of the indicator and amplification probes used. The emitted light may include wavelengths with a maximum intensity around about 450 nm, 500 nm, 525 nm, 550 nm, 575 nm, 600 nm, 625 nm, 650 nm, 675 nm, 700 nm, or any combination thereof. Detected light may include wavelengths with a maximum intensity around about 500 nm, 525 nm, 550 nm, 575 nm, 600 nm, 625 nm, 650 nm, 675 nm, 700 nm, or any combination thereof. The optical module may be configured to emit more than one, two, three, four, or more wavelengths of light. The optical module may be configured to detect more than one, two, three, four, or more wavelengths of light. One emitted wavelength of light may correspond to the excitation wavelength of an indicator molecule. Another emitted wavelength of light may correspond to the excitation wavelength of an amplification probe. One detected wavelength of light may correspond to the emission wavelength of an indicator molecule. Another detected wavelength of light may correspond to an amplification probe used to detect a reaction within the chambers. The optical module may be configured to image sections of an array of chambers. Alternatively, or in addition to, the optical module may image an entire array of chambers in a single image. In an example, the optical module is configured to take video of the device.

Figure 5:
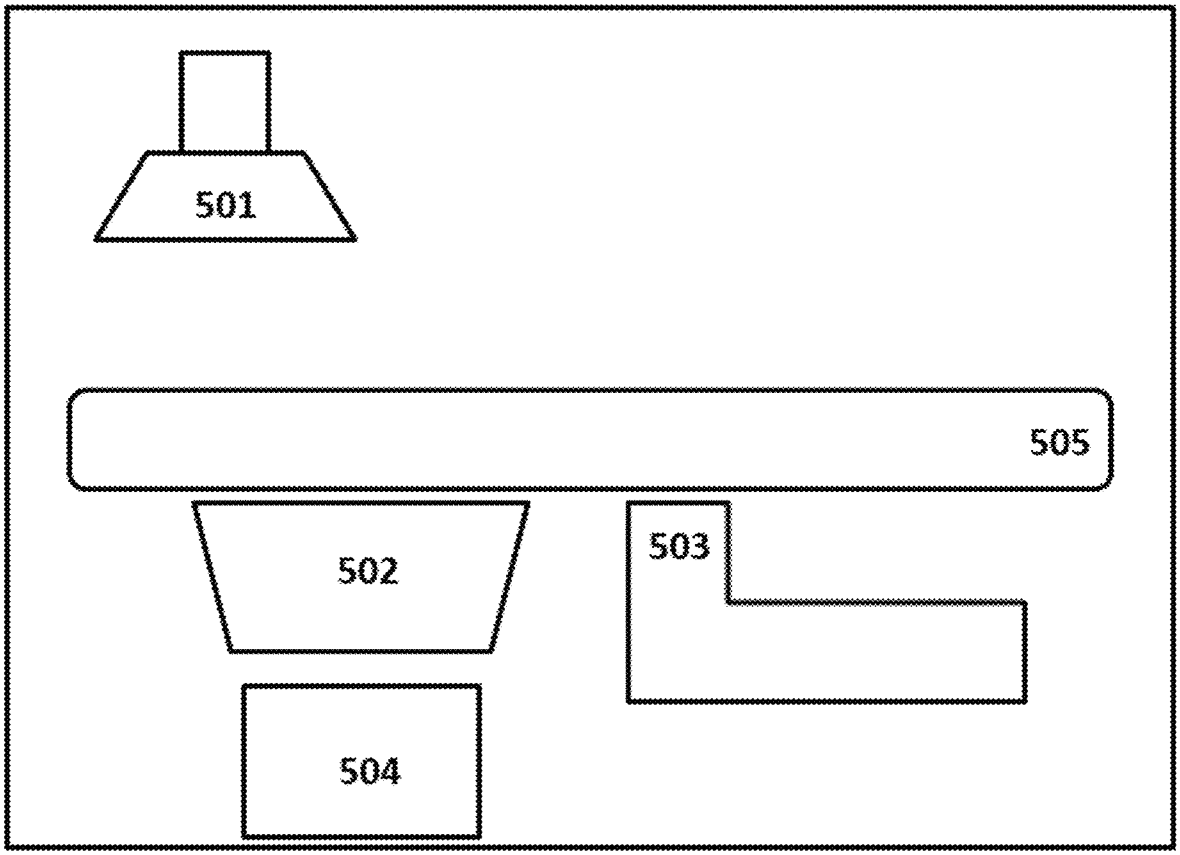
FIG. 5 schematically illustrates an example system for digitizing and analyzing a sample.

FIG. 5 illustrates a system 500 for performing the process of FIG. 4 in a single system. The system 500 includes a fluid flow module 501, which may contain pumps, vacuums, and manifolds and may be moved in a Z-direction, operable to perform the application of pressure as described in FIGS. 2A-2F. System 500 may also include a thermal module 502, such as a flat block thermal cycler, to thermally cycle the microfluidic device and thereby cause the polymerase chain reaction to run. System 500 further includes an optical module 503, such as an epi-fluorescent optical module, which can optically determine which chambers in the microfluidic device have successfully run the PCR reaction. The optical module 503 may provide this information to a processor 504, which may use Poisson statistics to convert the raw count of successful chambers into a nucleic acid concentration. A holder 505 may be used to move a given microfluidic device between the various modules and to handle multiple microfluidic devices simultaneously. The microfluidic device described above, combined with the incorporation of this functionality into a single machine, may reduce the cost, workflow complexity, and space requirements for dPCR over other implementations of dPCR.

The system may further include a robotic arm. The robotic arm may move, alter, or arrange a position of the microfluidic device. Alternatively, or in addition to, the robotic arm may arrange or move other components of the system (e.g., fluid flow module or detection module). The detection module may include a camera (e.g., a complementary metal oxide semiconductor (CMOS) camera) and filter cubes. The filter cubes may alter or modify the wavelength of excitation light or the wavelength of light detected by the camera. The fluid flow module may comprise a manifold (e.g., pneumatic manifold) or one or more pumps. The manifold may be in an upright position such that the manifold does not contact the microfluidic device. The upright position may be used when loading or imaging the microfluidic device. The manifold may be in a downward position such that the manifold contacts the microfluidic device. The manifold may be used to load fluids (e.g., samples and reagents) into the microfluidic device. The manifold may apply a pressure to the microfluidic device to hold the device in place or to prevent warping, bending, or other stresses during use. In an example, the manifold applies a downward pressure and holds the microfluidic device against the thermal module.

The system may further include one or more computer processors. The one or more computer processors may be operatively coupled to the fluid flow module, holder, thermal module, detection module, robotic arm, or any combination thereof. In an example, the one or more computer processors is operatively coupled to the fluid flow module. The one or more computer processors may be individually or collectively programmed to direct the fluid flow module to supply a pressure differential to the inlet port when the fluid flow module is fluidicially coupled to the inlet port to subject the solution to flow from the inlet port to the channel or from the channel to the chamber(s) and, thereby, partition through pressurized out-gassing of the chambers.

For example, while described in the context of a dPCR application, other microfluidic devices which may require a number of isolated chambers filled with a liquid, that are isolated via a gas or other fluid, may benefit from the use of a thin thermoplastic film to allow outgassing to avoid gas fouling while also providing an advantage with respect to manufacturability and cost. Other than PCR, other nucleic acid amplification methods such as loop mediated isothermal amplification can be adapted to perform digital detection of specific nucleic acid sequences according to embodiments of the present disclosure. The chambers can also be used to isolate single cells with the siphoning apertures designed to be close to the diameter of the cells to be isolated. In some embodiments, when the siphoning apertures are much smaller than the size of blood cells, embodiments of the present disclosure can be used to separate blood plasma from whole blood.

Computer Systems

Figure 6:
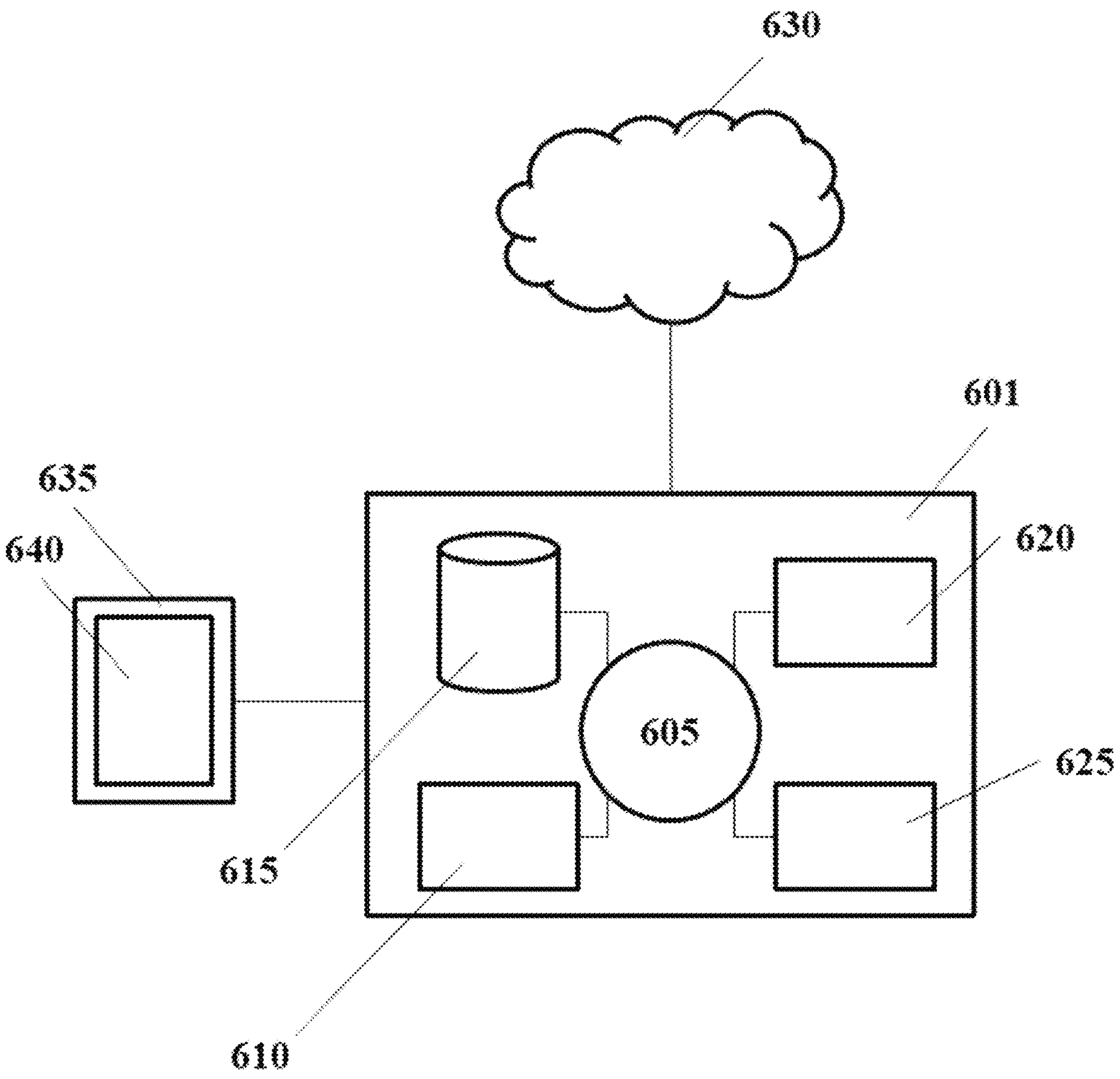
FIG. 6 shows a computer system that is programmed or otherwise configured to implement methods provided herein.

The present disclosure provides computer systems that are programmed to implement methods of the disclosure. FIG. 6 shows a computer system 601 that is programmed or otherwise configured for processing and analyzing a biological sample (e.g., nucleic acid molecule). The computer system 601 can regulate various aspects of the systems and methods of the present disclosure, such as, for example, loading, digitizing, and analyzing a biological sample. The computer system 601 can be an electronic device of a user or a computer system that is remotely located with respect to the electronic device. The electronic device can be a mobile electronic device capable of or otherwise configured to monitor and control the biological analysis system.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet or extranet, or an intranet or extranet that is in communication with the Internet. The network 630 in some cases is a telecommunication or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user (e.g., laboratory technician, scientist, researcher, or medical technician). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine-readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" in the form of machine (or processor) executable code or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, processing parameters, data analysis, and results of a biological assay or reaction (e.g., PCR). Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, regulate or control the system or implement the methods provided herein (e.g., sample loading, thermal cycling, detection, etc.).

EXAMPLES

Example 1: Digitization of a Sample in a Microfluidic Device

A microfluidic device as described herein was fabricated and is illustrated in FIGS. 7A-7G. The microfluidic device comprised a device body with a plurality of first (e.g., fluid flow) and second (e.g., outgas) channels. The fluid flow channels were in fluid communication with a plurality of chambers via corresponding siphon apertures. The outgas channels were disposed adjacent to the fluid flow channels. The fluid flow channels were further fluidically coupled to an inlet. The device further comprised a thin film covering at least part of the fluid flow channels, outgas channels and chambers.

Figure 7A:
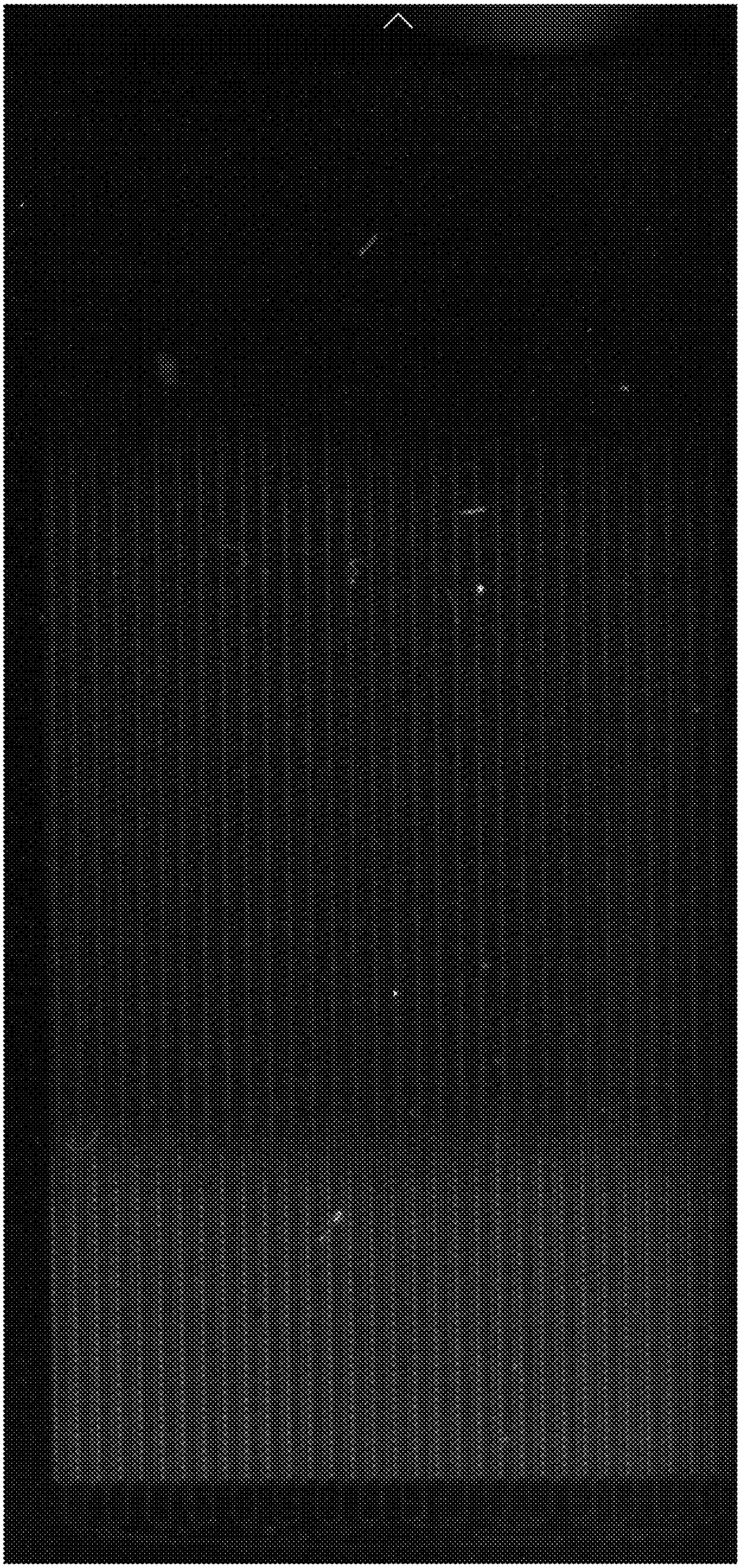
FIGS. 7A-7G illustrate an example microfluidic device and method for digitizing a sample within the device.
Figure 7B:
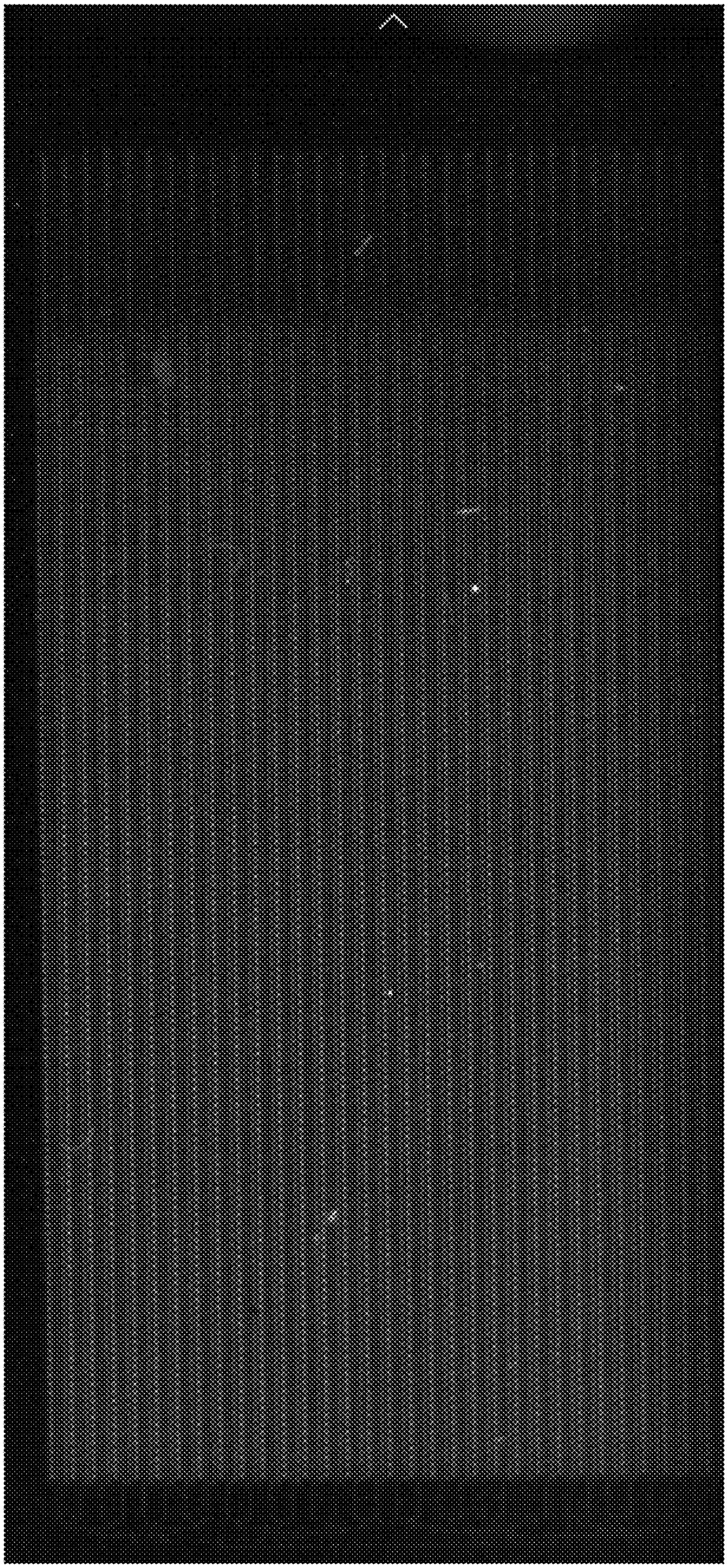
Figure 7C:
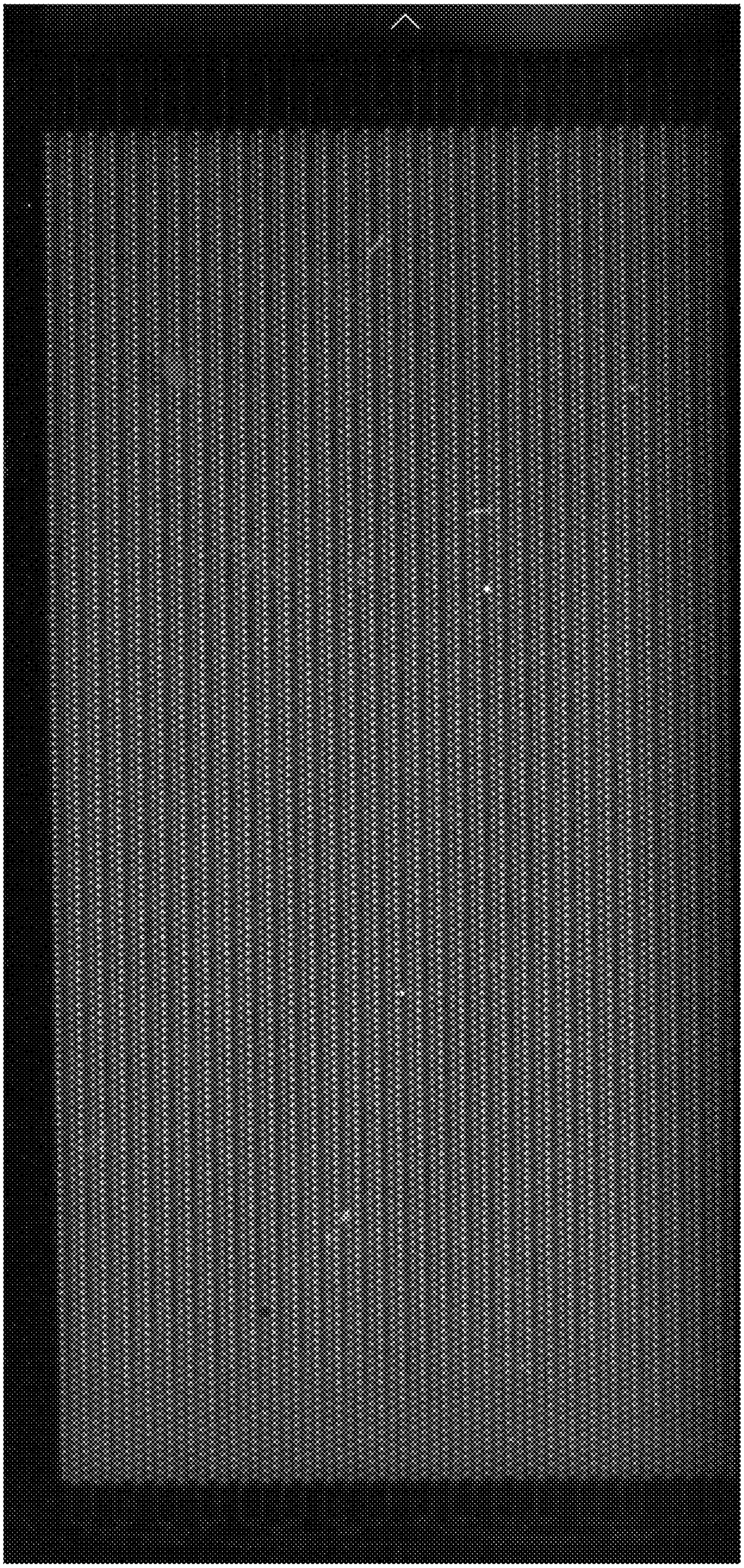
Figure 7D:
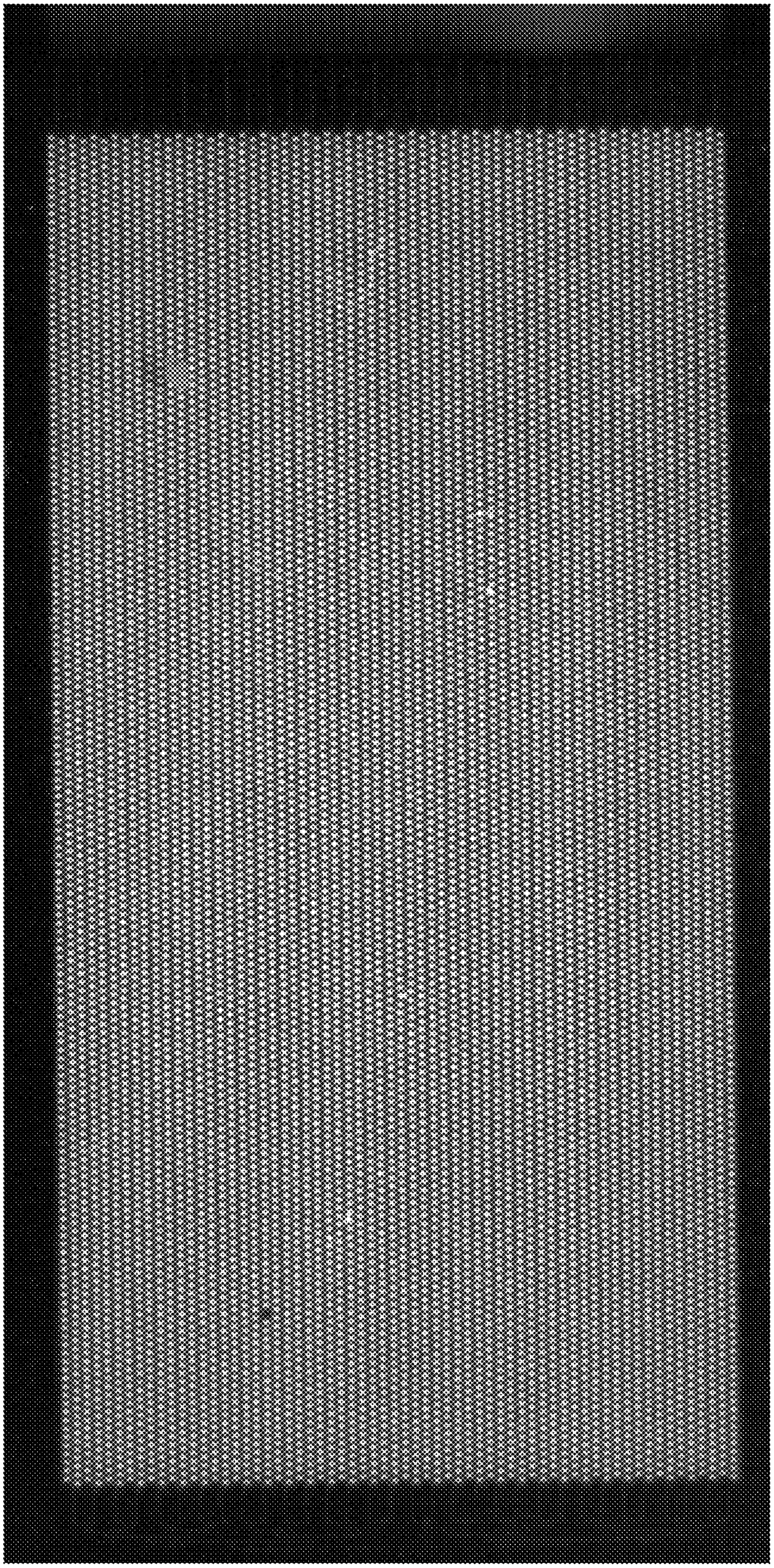

In a first step, a reagent was flowed into the cell through the inlet, as depicted in FIG. 7A. The regent flowed through the fluid flow channels into the plurality of chambers through the siphon apertures (FIG. 7B, 7C). A pressure differential was applied to cause the solution to outgas through the thin film and outgas channels. While outgassing, the reagent continued to fill the chambers (FIG. 7D).

Figure 7E:
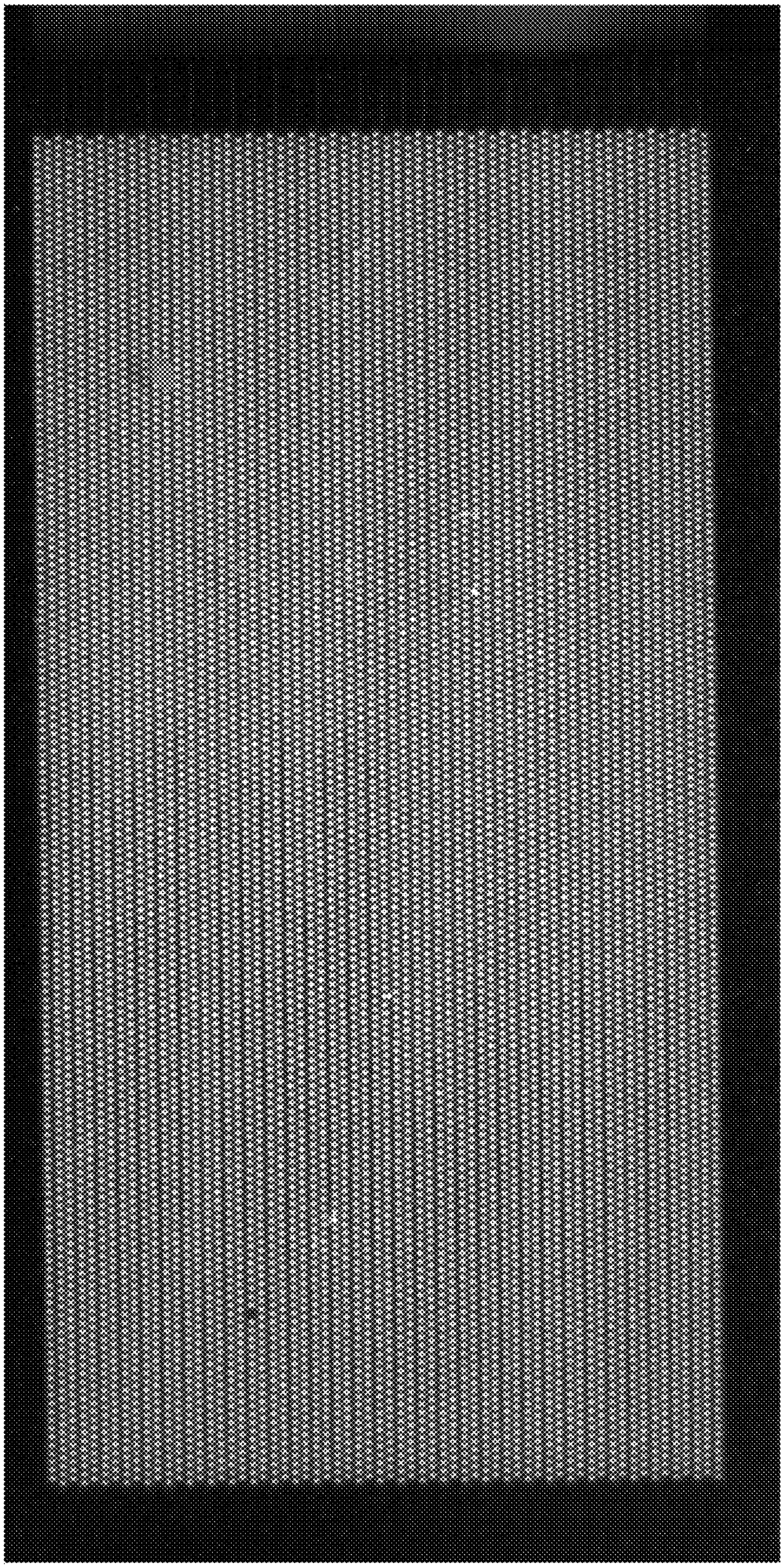
Figure 7F:
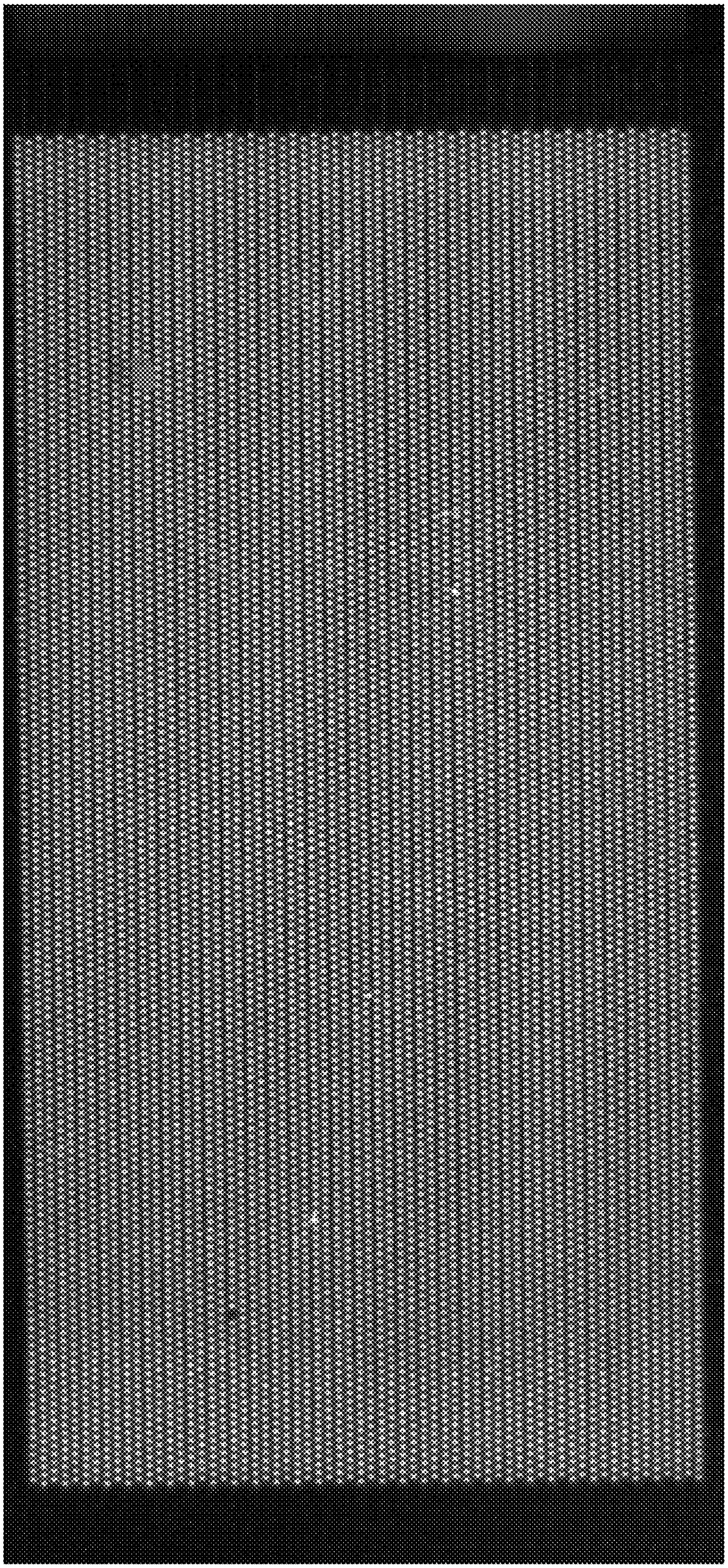
Figure 7G:
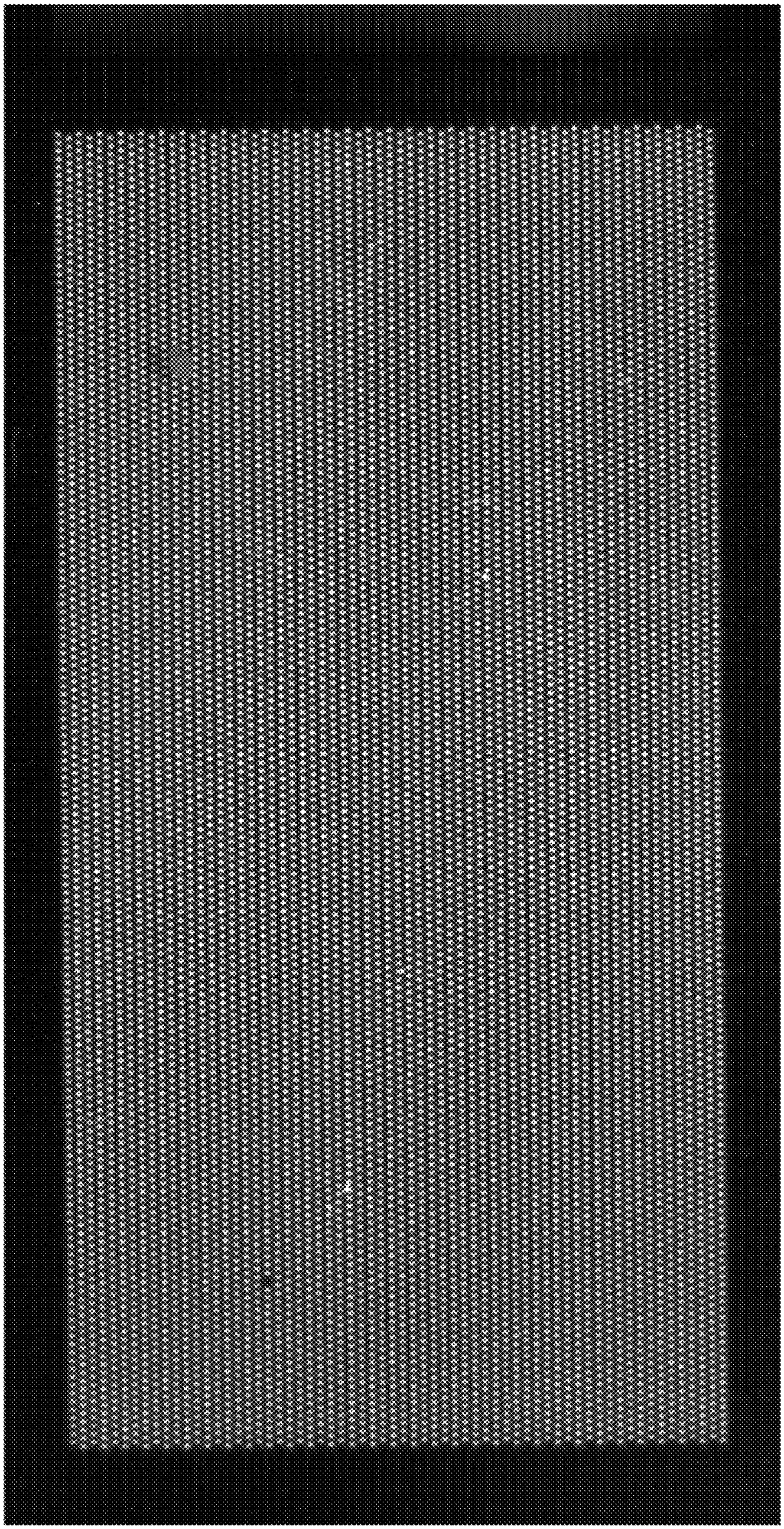

Another reagent (e.g., an oil) was then flowed into the device through the inlet, as shown in FIGS. 7E and 7F, and into the chambers through the fluid flow channels. Following this step, the sample was completely digitized as shown in FIG. 7G. Digitization was achieved in approximately twelve minutes.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A microfluidic device for processing a biological sample, comprising:

a first channel configured to receive a solution including said biological sample, said first channel having i) a first end coupled to an inlet port of the microfluidic device, and ii) a dead end;

a chamber in fluid communication with said first channel, wherein said chamber is configured to receive at least a portion of said solution from said first channel, and a film sealing at least one of said first channel and said chamber, wherein said film is configured to employ different permeability characteristics under different applied pressure differentials.

2. The microfluidic device of claim 1, wherein said chamber is one of a plurality of chambers in fluid communication with said first channel.

3. The microfluidic device of claim 1, wherein said film is substantially optically clear.

4. The microfluidic device of claim 1, wherein the inlet port is a single inlet port.

5. The microfluidic device of claim 1, further comprising:

a fluid flow module that provides a first pressure to direct the solution including the biological sample into the first channel.

6. The microfluidic device of claim 5, wherein the fluid flow module provides the first pressure to direct the solution including the biological sample from the first channel into the chamber.

7. The microfluidic device of claim 5, wherein the fluid flow module provides a second pressure to direct the solution including the biological sample from the first channel into the chamber.

8. The microfluidic device of claim 7, wherein the fluid flow module directs the solution from the first channel to the chamber without the use of valves between the chamber and the first channel.

9. The microfluidic device of claim 7, wherein the fluid flow module directs all of the solution into the chamber.

10. The microfluidic device of claim 2, wherein the plurality of chambers are fluidically isolated from each other.

11. The microfluidic device of claim 2, further comprising:

a fluid flow module that provides a first pressure to direct the solution including the biological sample into the first channel.

12. The microfluidic device of claim 11, wherein the fluid flow module provides the first pressure to direct the solution including the biological sample from the first channel into the plurality of chambers.

13. The microfluidic device of claim 11, wherein the fluid flow module provides a second pressure to direct at least a portion of the solution including the biological sample from the first channel into the plurality of chambers.

14. The microfluidic device of claim 13, wherein the fluid flow module directs the solution from the first channel to the plurality of chambers without the use of valves between the chamber and the first channel.

15. The microfluidic device of claim 13, wherein the fluid flow module directs all of the solution into the plurality of chambers.

16. The microfluidic device of claim 13, wherein the fluid flow module directs the solution by partitioning the solution such that a portion of the solution is in each of the plurality of chambers.

17. The microfluidic device of claim 16, wherein no residual of the solution remains in the first channel after partitioning the solution.

* * * * *